United States Patent
Tregger et al.

(10) Patent No.: US 12,528,749 B2
(45) Date of Patent: Jan. 20, 2026

(54) ADJUSTING CONCRETE MIXES AND MIX DESIGNS USING DIAGNOSTIC DELTA DATA CURVE

(71) Applicant: GCP Applied Technologies Inc., Wilmington, MA (US)

(72) Inventors: Nathan Tregger, Northborough, MA (US); Mark Roberts, North Andover, MA (US)

(73) Assignee: GCP APPLIED TECHNOLOGIES INC., Cambridge, MA (US)

( * ) Notice: Subject to any disclaimer, the term of this patent is extended or adjusted under 35 U.S.C. 154(b) by 480 days.

(21) Appl. No.: 18/009,191

(22) PCT Filed: Jun. 4, 2021

(86) PCT No.: PCT/US2021/035841
§ 371 (c)(1),
(2) Date: Dec. 8, 2022

(87) PCT Pub. No.: WO2021/252277
PCT Pub. Date: Dec. 16, 2021

(65) Prior Publication Data
US 2023/0212084 A1    Jul. 6, 2023

Related U.S. Application Data

(60) Provisional application No. 63/036,125, filed on Jun. 8, 2020.

(51) Int. Cl.
*C04B 40/00* (2006.01)
*B28C 5/42* (2006.01)
(Continued)

(52) U.S. Cl.
CPC ........ *C04B 40/0032* (2013.01); *B28C 5/422* (2013.01); *B28C 5/4231* (2013.01);
(Continued)

(58) Field of Classification Search
CPC ..... C04B 40/0032; C04B 28/02; B28C 5/422; B28C 5/4231; B28C 7/022; B28C 7/024; B28C 7/0418; B28C 9/002; G01N 33/383
See application file for complete search history.

(56) References Cited

U.S. PATENT DOCUMENTS 8,020,431 B2 * 9/2011 Cooley ................. B28C 5/4231
366/60
8,491,717 B2 * 7/2013 Koehler .................. B28C 7/024
106/713
(Continued)

FOREIGN PATENT DOCUMENTS

AU    2005215505 A1 *  9/2005  ............. B28C 5/422
CA    2246191 A1 *  3/1999  ............... B60P 3/16

OTHER PUBLICATIONS

AU-2005215505-A1, English Translation (Year: 2005).*
(Continued)

*Primary Examiner* — Ryan D Walsh
(74) *Attorney, Agent, or Firm* — Nields, Lemack & Frame, LLC

(57) ABSTRACT

The present invention allows for better control over strength in concrete mixes and mix designs, while minimizing the over-use of cement and promoting sustainability within the industry. Disclosed are novel method and system which employ a diagnostic delta data (DDD) curve, or, in other words, data that displays a curvilinear relationship when plotted on a visual graph, as obtained by considering the differences (e.g., subtractive differences or ratios) as between (i) target slump and target (or maximum) water content, and (ii) slump and water content values as determined using an automated slump monitoring system which measures slump and water content in the concrete mix during delivery. This DDD curve can then be compared to monitored delta slump and delta water content for later or (Continued)

other deliveries, such that adjustments can be made to the concrete mix or mix design, in a manner that encourages avoidance of cement over-dosing or over-prescription.

23 Claims, 4 Drawing Sheets

(51) Int. Cl.
    *B28C 7/02* (2006.01)
    *B28C 7/04* (2006.01)
    *B28C 9/00* (2006.01)
    *C04B 28/02* (2006.01)
    *G01N 33/38* (2006.01)

(52) U.S. Cl.
    CPC .............. *B28C 7/022* (2013.01); *B28C 7/024* (2013.01); *B28C 7/0418* (2013.01); *B28C 9/002* (2013.01); *C04B 28/02* (2013.01); *G01N 33/383* (2013.01)

(56) References Cited

U.S. PATENT DOCUMENTS

| | | | |
|---|---|---|---|
| 9,533,429 B2* | 1/2017 | Phares | B28C 7/0422 |
| 11,320,415 B2* | 5/2022 | Roberts | B28C 7/026 |
| 2008/0066653 A1* | 3/2008 | Andersen | C04B 28/02 106/713 |
| 2011/0004332 A1* | 1/2011 | Andersen | C04B 40/0032 700/265 |
| 2011/0004333 A1* | 1/2011 | Andersen | G05D 11/135 700/265 |
| 2018/0118622 A1* | 5/2018 | Monkman | B28C 7/02 |
| 2021/0291403 A1* | 9/2021 | Goldstein | B28C 7/026 |

OTHER PUBLICATIONS

CA-2246191-A1, English Translation (Year: 1999).*
Singaporean communication dated Jul. 15, 2025 in corresponding Singaporean patent application No. 11202260988X.
Philippine communication dated Oct. 3, 2025 in corresponding Philippine patent application No. 1/2022/553372.

* cited by examiner

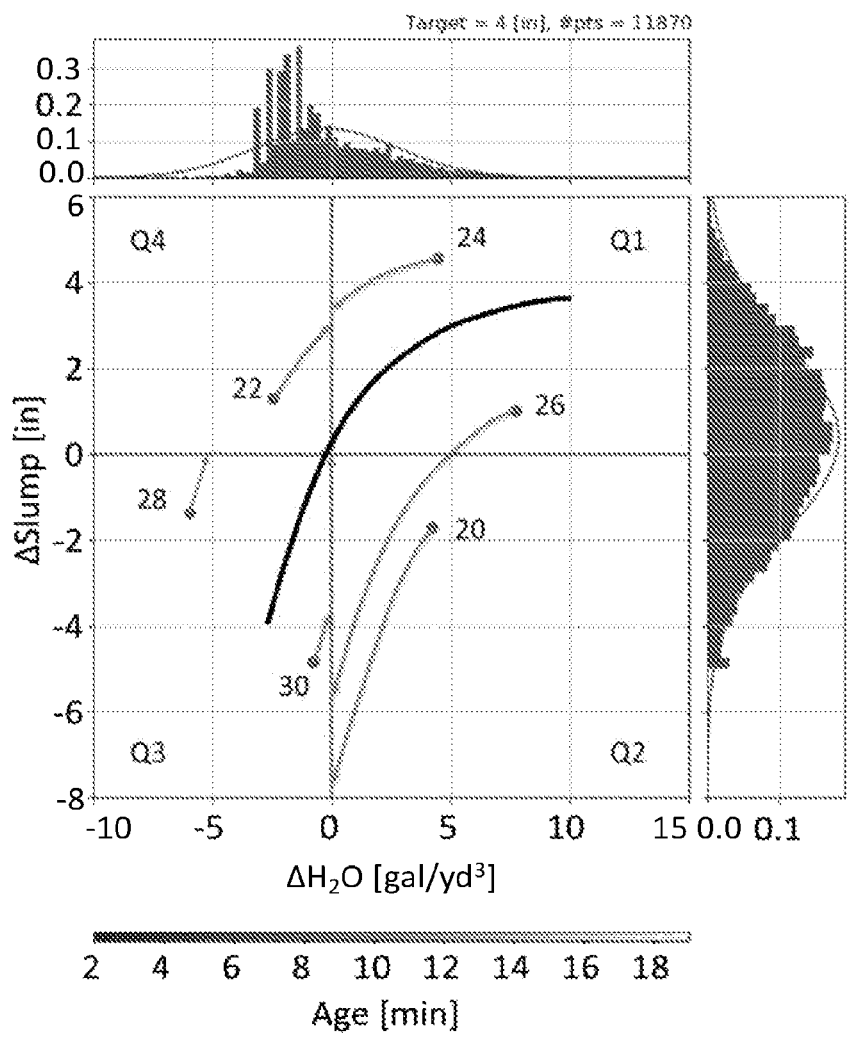

*Fig. 2*

| Quadrant in Fig. 2 | Relation to DDD curve | Water | Plasticizer | Cement | data point in Fig. 2 |
|---|---|---|---|---|---|
| Upper right (Q1) | Above | Decrease | Decrease | Decrease | 24 |
| Upper right (Q1) | Below | Decrease | Increase | Decrease | 26 |
| Upper left (Q4) | Above (only) | Increase | Decrease | Increase | 22 |
| Lower left (Q3) | Above | Increase | Decrease | Increase | 28 |
| Lower left (Q3) | Below | Increase | Increase | Increase | 30 |
| Lower right (Q2) | Below (only) | Decrease | Increase | Decrease | 20 |

Example Protocols for Adjusting a Concrete Mix or Mix Design using the DDD curve shown in Fig. 2

*Fig. 3*

ADJUSTING CONCRETE MIXES AND MIX DESIGNS USING DIAGNOSTIC DELTA DATA CURVE

FIELD OF THE INVENTION

This invention relates to manufacturing and processing of concrete; and, more particularly, to the use of a diagnostic delta data curve that involves consideration of target and delivery-monitored slump and water content values, and that facilitates strength attainment in concrete and sustainability in its production.

BACKGROUND OF THE INVENTION

There have been decades of conflict between the concrete producers who design and make concrete and the contractors who place the concrete at job sites.

Contractors want fluid concrete for ease of placement at the job site. Contractors like water to be added to increase workability or "slump" of the concrete. High slump means contractors can complete their job and finish faster. A gallon of water added for each cubic yard of concrete can generally increase slump by one inch. Unfortunately, added water diminishes strength of concrete in its hardened state.

Concrete producers anticipate the tendency to make water additions at the job site by using more cement in the concrete mix load, or increasing cement proportion in the mix design, so as to ensure that target strengths are met. The present inventors are concerned that, as the manufacture of cement requires the burning of fuel and leads to the generation of carbon dioxide, the over-use of cement in a concrete mix or mix design will adversely affect the environment.

Accordingly, the present inventors propose to address this problem by enabling monitoring and adjustment of concrete mixes and mix designs while avoiding reliance on cement over-use. The novel and inventive methods and systems disclosed hereinafter are believed to enhance sustainability in concrete production and delivery, as well as to enhance control over the strength of concrete and over the management of concrete mix designs.

SUMMARY OF THE INVENTION

In addressing the cement over-design/over-use problem described above, the present invention provides a novel method and system for adjusting a concrete mix or mix design, and facilitates control over the strength of the concrete when in the hardened state and the water content of concrete mixes when in the plastic state. The present invention is believed to avoid over-reliance on cement, or at least the kind of seat-of-the-pants over-dosing of cement that seems so prevalent up to this point in time, and thus to encourage sustainable practices in the concrete industry.

Exemplary methods and systems of the present invention involve concrete that is delivered from a batch plant to a construction site using a rotatable mixer drum, preferably one that is mounted on a concrete delivery truck, and more preferably one used in combination with an automated system for monitoring slump of the concrete mix load as well as total water content including batched water and water added during delivery into a truck concrete mixer drum.

As used herein, the term "delivery" encompasses the following periods: beginning at introduction into a mixer drum of ingredients for batching and mixing together to provide a uniform concrete mix load (e.g., cement, aggregates, batch water, and any optional admixtures), the transit period from batch plant to construction site, and up to the moment at which the concrete mix load is discharged from a mixer drum, such as the drum of a concrete delivery truck.

The concept of "diagnostic delta data curve" as used in the present invention can refers to differences between target slump value and target (or maximum) water content value, as compared to actual slump or total water content during delivery, as monitored/calculated by a slump monitoring device for a given concrete mix or mix design. The difference may be based on a subtractive value, such as by subtracting the monitored value during a current delivery (e.g., monitored slump) from a target value (target slump), or alternatively the differences may be based on a ratios, e.g., monitored slump value divided by target slump value.

In exemplary embodiments of the invention, comparison between target values and actual (monitored) values should be made preferably by comparing similar events during delivery or at similar age (time from batching). For example, if a target slump value or a target water content value for the concrete mix or mix design is intended to characterize the rheological state of the concrete load, such as at a single discharge event or at any number of multi-discharge events at the site, then this should be compared to the slump and water content of the concrete load, as monitored using a slump monitoring system installed on the delivery truck, at the same discharge event or discharge events during delivery.

In exemplary embodiments, the target slump and target (or maximum) water content values can be provided by the concrete producer, such as on batch tickets, and entered into the processor of an automated slump monitoring system (e.g., electronic version of batch ticket). These target (or maximum) values can be compared to the values for slump and water content as monitored by the slump monitoring system. An exemplary diagnostic delta data curve may be assembled by obtaining data based on, for example, one or more differences between the target slump and slump as monitored for the delivered concrete load (e.g., such as the subtractive differences between target slump minus currently monitored slump) or a ratio of the values (e.g., monitored slump divided by target slump). The calculated differences, in terms of subtractive values or ratios, is referred to as "Δ-Slump." Similarly, the DDD curve data would involve differences between the target or maximum water content and the actual total water content as measured by the slump monitoring system. One could thus consider differences in terms of the subtractive differences, such as target or maximum water content amount printed on a batch ticket or otherwise provided by the concrete producer for the given batch, minus the actual amounts of water dispensed into the mixer drum during batching and delivery up to the time of discharge; or, as mentioned above, the difference could be the ratio of total water in the batched concrete as summed with the water added into the concrete during delivery and up to the discharge event or events at the construction site, the sum then divided by the target or maximum water content value provided by the concrete producer (e.g., on the batch ticket). Such a calculated difference, in terms of subtractive values or ratios, is referred to as "Δ-$H_2O$").

If Δ-Slump is plotted as a function of Δ-$H_2O$, then a profile or curve (non-linear) relationship can be derived through linear regression analysis (e.g., by using a least-squares approach) at similar times during delivery. For example, a data curve based on delta values calculated based on subtractive differences between target and monitored values (e.g., target slump and water content values minus slump and water content values and determined using an automated slump monitoring system on the delivery truck during delivery of the concrete) can be illustrated as intersecting (0, 0) as shown in FIGS. 1 and 2 (and where the differences are calculated in terms of the ratio, e.g., the monitored values divided by the target values, the intersection would be (1, 1)). As this data curve can be used by a slump monitoring system for monitoring and for adjusting a concrete mix (such as the load contained in the truck mixer drum) or mix design (by having the slump monitoring system transmit information directly or indirectly through the cloud to the concrete producer's batch plant system processor), the present inventors refer to the curve profile shape of the data as a "diagnostic delta data" (DDD) curve.

Further details regarding how a DDD curve and curve data can be obtained will be explained in further detail herein. It will also be explained that in accordance with exemplary embodiments of the invention, the slump and water content for current or recent load deliveries can be compared to stored DDD curve information, and based on the comparison, the concrete mix (for the current delivery) or the mix design (for making concrete mixes for future delivery) can be adjusted.

While an exemplary diagnostic delta data (DDD) curve may be established theoretically using just two different data points (each involving different pairs of $\Delta$-Slump, $\Delta$-H$_2$O data points), the present inventors think that more accurate results, in terms of adjustments to the mix or mix design can be achieved by including data collected using automated slump monitoring systems that collect slump and water content data from numerous completed deliveries of concrete loads.

In other words, a more accurate and complete picture, in terms of a DDD curve based on $\Delta$-Slump, $\Delta$-H$_2$O data point will be obtained, and, more preferably, if the $\Delta$-Slump, $\Delta$-H$_2$O data points are obtained from a large plurality of completed deliveries of concrete that involve a particular mix design, wherein the concrete loads are monitored for slump and water content during delivery using slump monitoring systems that collect the slump and water content data.

In most preferred exemplary embodiments, the diagnostic delta data (DDD) involves $\Delta$-Slump, $\Delta$-H$_2$O data from at least one delivery wherein $\Delta$-Slump and $\Delta$-H$_2$O (calculated based on the differences between target and monitored values) are each zero (0, 0) when considering subtractive differences and (1, 1) when considering ratios. A delivery may have several $\Delta$-Slump and $\Delta$-H$_2$O data points associated with it (e.g., at leave plant, arrive site, and at discharge, illustrated for example, in FIG. 5 at 106, 110, and 112). If any one of these are (0, 0), then this qualifies the entire delivery (all their data points) to be used to make the diagnostic delta data curve for the particular concrete mix design. In further exemplary embodiments, using curve data that contains more than one delivery wherein at least one data point ($\Delta$-Slump, $\Delta$-H$_2$O) during delivery is (0, 0) increases accuracy of in making adjustments to the concrete mix or mix design.

An exemplary method of the present invention for adjusting a concrete mix load or mix design comprises:
  (A) batching at least one concrete mix load using a concrete mix design, into a concrete mixer drum, and calculating for the at least one concrete mix load a delta slump value ($\Delta$-Slump) and a delta water content value ($\Delta$-H$_2$O) wherein:
    i. $\Delta$-Slump value is calculated based on differences or ratios between a target slump value for the at least one concrete mix load and the slump value obtained for the at least one concrete mix during delivery thereof from a batch plant to a construction site; and
    ii. $\Delta$-H$_2$O value is calculated based on differences or ratios between a target maximum water content for the at least one concrete mix load and the water content value as determined for the concrete mix during delivery thereof from the batch plant to a construction site;
  (B) comparing the obtained $\Delta$-Slump and $\Delta$-H$_2$O with a diagnostic delta data curve defined by at least two data points, wherein each of the at least two data points is based on at least one concrete load delivery wherein both slump and water content targets are met (e.g., +1-1.5 inches in the case of $\Delta$-Slump or +/−1.5 gallons per cubic yard of concrete in the case of $\Delta$-H$_2$O when considering subtractive differences), and wherein at least one other data point concerns at least one concrete load delivery wherein at least one or both of the slump and water contents are not met (e.g., wherein at least one of $\Delta$-Slump and $\Delta$-H$_2$O are less or greater than zero where the delta values are calculated using differences or wherein at least one of $\Delta$-Slump and $\Delta$-H$_2$O are less or greater than one where the delta values are calculated using ratios); and
  (C) adjusting, or providing an indication of adjustment to, at least one of the following properties chosen from: slump, water content, cement content, chemical plasticizer content, aggregate content, or a combination thereof, in the at least one concrete mix load ora concrete mix design from which the at least one concrete mix load was batched, and delivering the at least one concrete mix load at a construction site after the adjustment is made to the mix load or batching at least one concrete mix load using the adjusted concrete mix design after the adjustment is made.

Again, the present inventors state that while delta values for slump ($\Delta$-Slump) and water content ($\Delta$-H$_2$O) can be calculated based on the differences using subtraction (e.g., target slump minus monitored slump; target or maximum water content minus the batch water and added water content), the delta values may also be calculated using ratios of monitored values as compared to target values (e.g., monitored slump value divided by target slump value; monitored water content divided by maximum or target water content). The discussion of examples in this specification will, for the most part, describe and illustrate the delta values calculated based on subtraction; for when the slump and water content of a delivered concrete mix made from a mix design is on target, then $\Delta$-Slump and $\Delta$-H$_2$O are both zero, and this data pair can be plotted as a common point (0, 0) representing the intersection of a vertical axis (representing slump in inches) and a horizontal axis (representing gallons per cubic yard of concrete), from which a curve profile can be generated to include data pairs wherein one or both $\Delta$-Slump and $\Delta$-H$_2$O are not equal to zero (not 0, 0). Hence, use of subtraction to calculate delta values will facilitate illustrative graphic examples herein.

In various exemplary methods, the adjustment may involve changes in the amounts of cement, water, plasticizer, or proportions of two or more of any of these components in the concrete mix design (e.g., in the recipe at the batch plant for batching the concrete mix components), in a concrete mix load (e.g., in increasing water or plasticizer amounts in the concrete mix drum during delivery in a concrete mixer truck). If slump is below target and provision is made at the construction site for adding cement into the concrete mix during delivery (e.g., including discharge or discharges of concrete from the mixer drum at the site), then additional cement amounts may be added at the construction site; but a more preferred mode is by "providing an indication of adjustment to" the slump, by which is meant that the slump monitoring system is programmed to provide an indication (e.g., to the project manager at the site, for example as shown in FIG. 5 at 114, 116) that the concrete should be allowed to sit in the mixer drum (See FIG. 5, delivery truck at 110) for a time so that hydration can occur and slump levels can increase to the target slump before the concrete is discharged from the mixer drum (e.g., FIG. 5, delivery truck at 112).

An exemplary system of the present invention comprises at least one concrete monitoring system having at least one computer processor unit (CPU) in communication with sensors for measuring slump of and water additions into concrete mix loads delivered (in one or more delivery trucks travelling from batch plants to construction sites), the CPU configured to perform the above-described exemplary method for adjusting a concrete mix or mix design. See e.g., FIG. 5 at 104, 106, 110, 112, which can represent one truck or a plurality of different trucks at various stages of the delivery of concrete).

Exemplary methods and system of the invention enable a reportage as well as visual illustration of an exemplary diagnostic delta data ("DDD") curve, comprising $\Delta$-Slump and $\Delta$-H$_2$O data points obtained from an automated slump monitoring system; and can allow the concrete manufacturer and other concrete supply chain participants to incentivize cooperative, sustainable behavior in the delivery and placement of concrete.

Another exemplary method or system of the invention comprises: collecting $\Delta$-Slump and $\Delta$-H$_2$O data pairs from a plurality of delivered concrete loads using a slump monitoring device on at least one concrete delivery truck, deriving a "diagnostic delta data" (DDD) curve (i.e., a visual profile) based on a curvilinear relationship of averaged and/or normalized $\Delta$-Slump and $\Delta$-H$_2$O data pairs wherein, in at last one of the pairs, the target slump and target water content were met (e.g., wherein $\Delta$-Slump=$\Delta$-H$_2$O=zero (+/− 1.5 inches in the case of $\Delta$-Slump; (+/−1.5 gallons per cubic yard of concrete in the case of $\Delta$-H$_2$O; preferably 1.0, more preferably 0.50, most preferably 0.25 in either case)); and displaying, on a monitor or screen, the DDD curve intersecting two perpendicular axes (e.g., which intersect at (0, 0) and further displaying, in spaced relationship to the DDD curve, at least one $\Delta$-slump, $\Delta$-H$_2$O data point (and more preferably a plurality of such data points) obtained from a subsequent concrete mix load delivery, wherein at least one or both of the A-slump and $\Delta$-H$_2$O values are less or greater than zero.

An example of DDD curve is illustrated in the quadrant graph of FIG. 2, and further exemplary embodiments include displaying of slump and water content histograms above and to the left of the quadrant graph. Various exemplary systems and methods involve the use of at least one slump monitoring system for compiling $\Delta$-Slump, $\Delta$-H$_2$O data points for a given concrete mix, and processors programmed for generating quadrant graphs based on the DDD curve and for displaying $\Delta$-Slump, $\Delta$-H$_2$O data points for concrete deliveries, wherein one or both of the slump or water targets is not met (e.g., $\Delta$-Slump or $\Delta$-H$_2$O is not zero), and these can be depicted in relation with the DDD curve on a monitor or video screen.

Thus, exemplary embodiments of the invention can use the DDD curve for adjusting concrete mixes or mix designs based on $\Delta$-Slump, $\Delta$-H$_2$O data which departs from DDD curve behavior, displaying $\Delta$-Slump, $\Delta$-H$_2$O data which departs from DDD curve behavior so that adjustments to the concrete mix or mix design can be contemplated; and indeed allows the user of the method or system to elect whether to use one or both of these capabilities. The novel and unique derivation of the diagnostic delta data (DDD) curve thus enables vast improvement in processor-enabled methods and systems for monitoring and/or adjusting concrete mix and mix designs.

Further advantages and features of the invention will be described in further detail hereinafter.

BRIEF DESCRIPTION OF THE DRAWINGS

An appreciation of the benefits and features of the present invention may be more readily comprehended by considering the following written description of exemplary embodiments in conjunction with the drawings, wherein

FIG. 2 is a graph illustrating the DDD curve and histogram of FIG. 1, but this time illustrating examples where one or both of $\Delta$-Slump, $\Delta$-H$_2$O values (wherein paired values are shown as a dot on the graph) is not zero; and directional arrows indicate exemplary directions by which the concrete mix or mix design can be adjusted closer towards target slump and water values;

FIG. 3 is a chart that summarizes exemplary protocols for adjusting a concrete mix or mix design based on $\Delta$-Slump, $\Delta$-H$_2$O values obtained by slump monitoring system during delivery and comparing data with stored $\Delta$-Slump and $\Delta$-H$_2$O data points illustrated by the DDD curve shown in FIGS. 1 and 2;

DETAILED DESCRIPTION OF EXEMPLARY EMBODIMENTS

Figure 1:
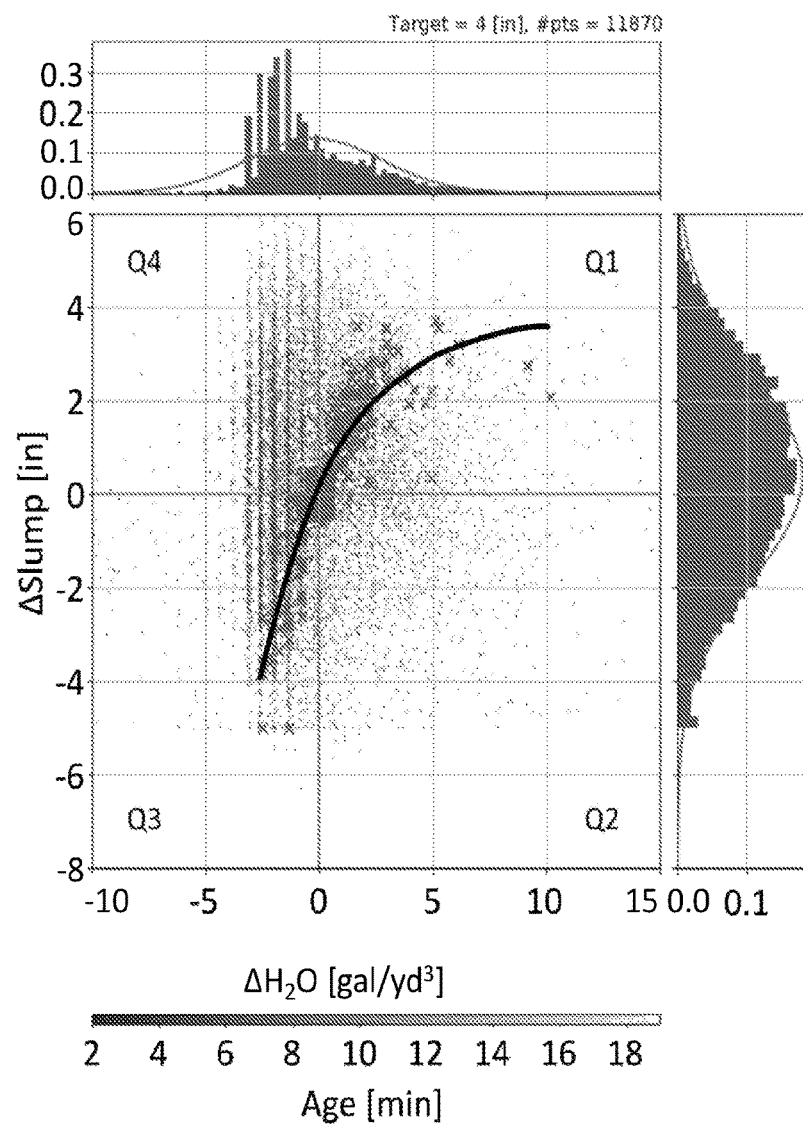
FIG. 1 is a graphic illustration of example delta slump values ("$\Delta$-Slump" plotted along vertical axis) and example delta water content values ("$\Delta$-H$_2$O" plotted along horizontal axis) as calculated by slump monitoring system(s) based on data obtained from concrete deliveries, from which a "diagnostic delta data" (DDD) curve can be derived and shown intersecting (0, 0) where $\Delta$-Slump=$\Delta$-H$_2$O=zero; and wherein the number of occurrences of the $\Delta$-H$_2$O values and $\Delta$-Slump values are shown using, respectively, upper and side histogram bar graphs.

Various terms used herein shall have the following definitions.

"Cement" refers to Portland cement which is produced by pulverizing clinker, a fused mass comprising hydraulic calcium silicates and one or more forms of calcium sulfate (e.g., gypsum) as an inter-ground additive, into powder form. Portland cement is often used with supplemental cementitious materials (SCMs), e.g., fly ash, blast furnace slag, limestone, or natural pozzolans, or mixtures thereof, when used as a binder material for making concrete.

"Concrete" and "concrete mix" refer to a mixture of cement and aggregates (e.g., sand and crushed gravel or stones), water, and optional chemical admixtures, which can include a chemical plasticizer that is otherwise called a water-reducer (because they allow for a certain workability or slump to be retained while replacing a portion of water otherwise required to achieve the same workability or slump level), set accelerators, set retarders, air entraining agents, air detraining agents, fibers, etc.).

"Concrete mix design" and "mix design" and the like refer to the ingredients and proportions of ingredients used for making a given concrete having one or more desired properties, whether in a plastic state, hardened state, or both. At a minimum, the present inventors contemplate that a concrete mix design would include cement amount, water amount, and aggregate amount, and optionally chemical admixture amount(s), e.g., optional plasticizer or plasticizers, air detraining agents, or other chemical admixtures. The concrete mix design could be stored in a number of places, such as in a memory file where a concrete producers mix designs are collected (and this is sometimes referred to as a mix design "catalog") at the batch plant, office, or in the cloud, or other storage locations of the concrete producer.

A concrete mix is often designed based on various factors, such as, for example, cement type, aggregate type, water-to-cement ratio (w/c), chemical admixture, air characteristic, and other factors or ingredients. Mix designs are designated by a "mix code" or string of symbols which is an identifier for the particular proportions of ingredients. A set of identical proportions of ingredients may have different mix codes. Furthermore, a mix code within a given producer's collection of mix codes may refer to different proportions of ingredients. This case arises when the same basic mix design is used at different concrete plants owned or controlled by a single concrete producer. Because each individual concrete plant may source materials from different places (e.g. aggregates from different local quarries), the proportions of ingredients may vary slightly. The proportions of mix design components (e.g., cement, aggregate, water, optional admixtures) may be expressed as amounts of material per volume of concrete (e.g. 611 pounds of cement per cubic yard of concrete). The proportions may also be expressed as fractions or percentages (e.g. 3 ounces of a superplasticizer admixture per 100 pounds of cement). The concrete components are often described in terms of types: such as cement, supplementary cementitious materials, aggregates (fine, coarse, or both), water, and admixtures. The components may individually be characterized in terms of type or source. If more than one source of a particular material exists for a producer, for example, the mix design might indicate the particular type (e.g. cement ASTM Type I versus cement ASTM Type III, or ASTM C33 #57 stone versus ASTM C33 #7 stone), or source (e.g. coarse aggregate that is dug from a river bed versus coarse aggregate that is crushed from a quarry). Additional information may be included in the mix design, along with the proportions of ingredients, such as, for example, target performance values. These performance values may be a design strength (e.g. strength at 28 days), a target slump or slump range, a target air content or air range, a durability target or range (e.g. shrinkage, creep, etc.), etc.

A concrete mix design may have an "assigned strength" which is a number corresponding to a compressive strength value (usually in units of pounds per square inch or PSI) at a given age (e.g., 28 days after mixing the components including water together to initiate hydration) such as obtained from empirical testing of cylinder samples made in accordance with standards such as ACI 211.1-91 and ACI 318-14. However, whereas ACI 211.1-91 designates a design strength (i.e., strength to satisfy structural requirements), a required average strength value is designated by ACI 319-14 that takes into account both the design strength and variability at which the concrete mix design is produced (e.g., average and standard deviation of the last 30 batched concrete mixes). This figure may include an overdesign from the design strength to ensure that the design strength is met on a statistically acceptable basis. In general, the higher the variability, the higher the overdesign to ensure the strength is met. The assigned strength value or number may be chosen to be the design strength or the required average strength. Alternatively, the concrete producer may assign a strength number based on water/cement, cement content, packing fraction, or other factors.

"Hydrate" and "hydratable" refer to cementitious materials such as concrete which undergo or can undergo hardening by chemical interaction with water. Water is often batched with cement and aggregates into mixer drums at the batch plant of the concrete producer. The amount of water batched into a concrete mix load is usually enough to create a plastic, workable concrete load, in which hydration is initiated such that the concrete mix load can be delivered to and poured at the job site from a mixer drum mounted on a delivery truck.

"Slump" as used herein will refer generally to the property of concrete workability, such as may be determined, for example, using a conventional vertical drop measurement of concrete that is unmolded from a standard truncated cone (see e.g., ASTM C143-15a), but "slump" could also include "slump flow" which refers to measuring the horizontal spread of concrete as released from a cone (see e.g., ASTM C1611-14). Hence, the term "slump" may be used to refer to either or both of these rheological properties but is not limited to either slump or slump flow measurement, and may include rheology values such as "yield stress", "viscosity", "thixotropy", etc. Hence, the term "slump" is used as a convenient way of referring to rheology of concrete in its plastic state.

"Slump monitoring system(s)" or "automated slump monitoring system(s)" as used herein refer to the use of one or more sensors in communication with a computer processor unit (CPU) that is programed or configured to calculate a value, or to provide an indication, corresponding to a slump value (or other rheological property) of a plastic concrete mix. Such systems have been taught in the literature for monitoring slump of concrete in rotatable mixer drums using various types of electronic and/or electromechanical sensor devices. For example, the energy associated with rotating concrete in a mixer drum can be monitored using force or stress probes and correlated with the slump level of concrete. See e.g., U.S. Pat. Nos. 8,858,061 and 9,199,391. Hydraulic pressure sensors may be used for correlating with slump of concrete. See e.g., U.S. Pat. No. 5,713,663 of Zandberg (Boral). The present inventors prefer that hydraulic pressure sensors, force or stress or strain gauges, and the like, be used in combination with sensors that measure the rotational speed of the mixer drum. See e.g., U.S. Pat. No. 8,727,604 of Compton et al.; US Pat. Publ. No. 2015/0142362 of Jordan et al.; U.S. Pat. No. 9,199,391 of Beaupre et al., and US Pat. Publ. No. 2015/0355160 of Berman, etc.).

Slump monitoring systems are commercially available from GCP Applied Technologies Inc. of Cambridge, Massachusetts USA, under the VERIFI® brand name. The VERIFI® products group through GCP has published numerous slump monitoring patents. See e.g., U.S. Pat. Nos. 8,020,431; 8,118,473; 8,311,678; 8,491,717; 8,727,604; 8,746,954; 8,764,273; 8,818,561; 8,989,905; 9,466,803; 9,550,312; 9,956,246; 10,183,418; and others.

Slump monitoring systems contemplated for use in the present invention can include measuring of various forms of energy required to rotate, or otherwise of the force or energy associated with rotating, concrete within a mixer drum. The mixer drum can be located in a batch plant, and, more preferably, the mixer drum is mounted on a concrete delivery truck. While hydraulic pressure sensing technology, such as used in VERIFI® monitoring systems is preferred, it is contemplated that use of force probes (e.g., stress or strain gauges) can also be used for monitoring rheology such as slump. Such force probes are based on stress- and/or strain-gauge probes mounted within the mixer drum. See e.g., U.S. Pat. Nos. 8,848,061 and 9,625,891 of Berman (owned by GCP Applied Technologies), U.S. Pat. No. 9,199,391 of Denis Beaupre et al. (Command Alkon Inc.), or US Publ. No. 2009/0171595 and WO 2007/060272 of Benegas. It is also contemplated that electric power used for rotating the mixer drums can also be used for monitoring slump of the concrete (See e.g., https://www.electrive.com/2020/03/29/liebherr-presents-electric-concrete-mixer-truck.) Thus, the present inventors believe that it is possible to monitor energy or force data associated with mixing the concrete, and that such monitored data can be correlated with slump and water content information relative to concrete loads.

The present inventors prefer to employ hydraulic pressure sensors as compared to force sensors that measure concrete properties only when submerged within the concrete. Hydraulic pressure sensing can be done throughout the drum revolution, see e.g., U.S. Pat. No. 8,960,990, and the data can be monitored conveniently at various drum speeds. See e.g., U.S. Pat. Nos. 8,118,473 and 8,020,431. An accelerometer can be mounted on the drum for use in measuring drum speed, see e.g., U.S. Pat. No. 8,727,604; as well as on the truck frame for measuring tilt angle of the delivery vehicle to compensate for road effects on slump measurement, See e.g., U.S. Pat. No. 8,746,954. In addition to hydraulic pressure and drum speed sensors, one may employ a temperature sensor on the mixer drum to refine slump calculations, e.g., U.S. Pat. No. 8,989,905. The use of hydraulic pressure sensors, such as installed on the charge and discharge ports, is preferred by the present inventors because it facilitates monitoring of very high slump concrete, See e.g., U.S. Pat. No. 8,818,561 (slump flow monitoring). The foregoing patents are owned by GCP Applied Technologies Inc. or its affiliate VERIFI LLC, both of Cambridge, Massachusetts USA.

"Water content" as used herein will refer to the amount of water, percentage wise by volume of a concrete mix or mix design, unless otherwise indicated. In various exemplary embodiments, this may also be expressed in terms of water to cement ratio (w/c); and if this is the case, then it will be understood that this ratio will be based on weight of water to dry weight of cement (Portland cement). The water content of a concrete mix load or mix design will be based on the initial amount of batch water used or prescribed for making a particular mix batch loaded into the mixer drum of a delivery truck, for example. This water amount is usually printed on the batch ticket that is issued by the concrete producer for the particular load, and reflects the original water amount that is part of the concrete mix design. In example embodiments, this water amount may be designated as "maximum allowable water content," "maximum water content," "maximum allowable water amount," or "maximum water amount," and this water amount or value can be provided using other means by the concrete producer for the given concrete mix or mix design, and this will be taken and used as an example of "target water content" for purposes of the present invention.

Added water, that is, water amounts that are introduced into the truck load of concrete during delivery after initial batching (e.g., during transit or just before discharging the concrete at the job site) can be measured by using a flow meter and/or valve in communication with the computer processor of the slump monitoring system processor on the delivery truck. The total water content is then calculated by a slump monitoring system by adding the amount of initial batch water to the amounts of water that are added during delivery (e.g., as triggered by operation of the slump monitoring system) including up to the moment that the concrete mix is discharged at the job site. This calculated total water content is subtracted from the target water content value, such as the maximum water content value as indicated by the concrete producer on a batch ticket (and this maximum value can also be transferred electronically by the batch system computer to the slump monitoring system onboard the delivery truck).

In other example embodiments, the present inventors envision that an optional "sneak water" detection program can be deployed in or as part of a slump monitoring system. In U.S. Pat. No. 9,466,203 (owned by GCP) entitled "Sneak Water Detection for Concrete Delivery Vehicles," Jordan et al. disclosed that a slump monitoring system could be used to determine amounts of added water introduced into the concrete mix load during delivery, even if the water was not introduced through valves or flow meter onboard the delivery truck. This is an example of a detection system or process that could optionally be used to detect water amounts added during delivery.

In further exemplary embodiments, the present inventors envision that an optional "grey water" detection process or system can be used to ascertain accurate water content in concrete mix loads batched in the mixer drum. By "grey water," the inventors refer to the amount of water that is contained in the mixer drum before components are batched into the drum to create a concrete mix load, such as remaining wash-out water from the previous load. In International Publication No. WO 2019/032820 A1 (owned by GCP Applied Technologies Inc.), Mark Roberts et al. disclosed a method and system to measure and monitor the grey water content in a rotating concrete mixer drum mixer truck using a sensor attached to the interior of the concrete mixer drum. By measuring the grey water content before a batching process takes place, the batched water (and cement content and admixture type and content) can be modified in order to maintain expected performance of the batched load in terms of both strength and rheology, or more simply, some or all of the gray water can be discharged from the concrete mixer drum before batching.

"Batch ticket" as used herein refers to a document that is issued by the concrete producer to accompany the concrete mix load batched into the mixer drum of a delivery truck. Such document, which could also be issued in electronic form, typically includes the mix design identification number as well as relative amounts of constituents per cubic yard of concrete: e.g., 564 pounds of cement per cubic yard of concrete), as well as actual batched weights of other components. Batching is not an entirely accurate process, and some deviation occurs, although within a given tolerance (e.g., 1% by mass). A batch ticket can also include the amount of water batched, as well as an amount of water withheld from the load: this is usually termed "trim water" (as in trimming back water). The intent is that the driver (or more preferably, a VERIFI® slump monitoring system) will add water to get to the desired slump without exceeding maximum water content, which is often indicated on the batch ticket. A batch ticket may also include job site address, cost of the concrete, special instructions (e.g., placing precautions), time and date of manufacture. It often includes properties required at discharge: such as a slump target, air target, temperature maximum, drum revolution maximum, time maximum, or others.

For the purposes of the present invention, the slump monitoring system processor, which is used on the truck or for receiving signals from various sensors on or in the truck or mixer drum, is preferably used for receiving slump target information (e.g., electronic batch ticket information, or specifications from the concrete producer batch system computer or from a dispatch center) as well as data from the onboard slump monitoring sensor(s) (e.g., hydraulic pressure sensor or force sensor as discussed above) and also for receiving water content information, such as maximum allowable water content to be added to the concrete as well as data from onboard sensors (e.g., metering sensors, valves) for recording added water amounts. This is so that delta slump ($\Delta$-Slump) and delta water content ($\Delta$-$H_2O$) values can be calculated based on data accumulated from one or more, and preferably a plurality, of deliveries of concrete mix loads made and delivered to a construction site according to a concrete mix design.

"Diagnostic delta data curve" (DDD curve) or "delta curve data" refers to a relationship, as explained in the summary section above, comprising delta slump ($\Delta$-Slump) and delta water content ($\Delta$-$H_2O$) pairs. An exemplary DDD curve can be plotted visually as illustrated in the graph examples of FIGS. 1 and 2 and discussed below.

In FIG. 1, exemplary delta slump values ($\Delta$-Slump) are plotted along the vertical axis, while exemplary delta water content values ($\Delta$-$H_2O$) are plotted along the horizontal axis. $\Delta$-Slump and $\Delta$-$H_2O$ are calculated by considering one or more differences or ratios between target values (or assigned maximum values) and the monitored values during delivery of concrete. As noted, the present inventors have collected such data using Verifi® monitoring system commercially available from GCP Applied Technologies Inc. Cambridge, Massachusetts USA. For example, $\Delta$-Slump can be based on arithmetic difference between a target slump value and the slump value as measured (at similar age) during delivery by the monitoring system; and $\Delta$-$H_2O$ can be based on arithmetic difference between target water content value (e.g., maximum water content value assigned by concrete producer on batch ticket) and water content including the batched mix water and water added during delivery as determined by the slump monitoring system on the mixer truck. As another example, the delta values can be calculated as a ratio. $\Delta$-Slump can be calculated using the ratio of slump value as measured during delivery by the monitoring system divided by the target slump value; and $\Delta$-$H_2O$ can be based on the ratio of maximum water content value assigned by concrete producer on batch ticket) divided by the summed values of batched mix water and water added during delivery as determined by the slump monitoring system on the mixer truck. Whether the subtractive differences or differences in terms of ratios (or any other difference) is considered, the delta values are taken at similar ages. FIG. 1 includes a color scale to indicate age (minutes after initial batching) at which data may be obtained for determination of the delta values.

For ease of discussion, the present inventors may from time to time refer to $\Delta$-Slump and $\Delta$-$H_2O$ values calculated based on the "differences" between target values stored (e.g., in the cloud, as previously derived by slump monitoring systems on the concrete delivery trucks) and actual monitored values during a subsequent delivery (e.g., as calculated during delivery by slump monitoring systems); and this comprehends subtractive differences between the values, as well as ratios of actual monitored values divided by the target (or maximum) values.

After a minimum of two deliveries of concrete, more preferably after 10 deliveries, and most preferably after 50 deliveries, one may find that one or more of these deliveries involve concrete loads delivered on target (e.g., wherein $\Delta$-Slump=$\Delta$-$H_2O$=zero for a given concrete load). This situation will facilitate the discernment, derivation, and/or visualization of a curvilinear relationship among the points defined by $\Delta$-Slump and $\Delta$-$H_2O$ pairs as obtained preferably from at least two, and more preferably from a plurality, of concrete loads delivered using the same mix design. This relationship is illustrated by the exemplary single curved line intersecting both axes (0, 0) in FIGS. 1 and 2 (which consider subtractive differences).

While the use of a large plurality of concrete deliveries is not believed to be necessary to the practice of the invention, it does lend greater accuracy to the visual illustrations shown in FIGS. 1 and 2. The example curve data illustrated in FIGS. 1 and 2 was obtained from data collected by slump monitoring systems using a number of delivery trucks and taken from 11,870 separate completed deliveries. The target slump (at discharge) happened to be set at 4 inches, and the large number of deliveries was chosen for clarity of illustration. While it is possible that different job projects could involve different target slumps, a common delivery slump target is four (4) inches for many construction applications.

The histograms shown at the top and right side of FIGS. 1 and 2 illustrate the number of occurrences for a given slump value (e.g., 3" to 3.5" or 6" to 6.5") or for given water values (e.g., 2 to 2.5 gallons per cubic yard (gpy) of concrete or 4-4.5 gpy). Based on the averages and standard deviations of the $\Delta$-$H_2O$ and $\Delta$-Slump data, a Gaussian distribution can be plotted over the histograms to represent a normal distribution using the equation:

$$f(x) = \frac{1}{\sigma\sqrt{2\pi}} e^{-\frac{1}{2}(\frac{x-\mu}{\sigma})^2},$$

where f(x) is the probability, x is the value (of either the $\Delta$-$H_2O$ or $\Delta$-Slump value), p is the average (of either the $\Delta$-$H_2O$ or $\Delta$-Slump data), a is the standard deviation (of either the $\Delta$-$H_2O$ or $\Delta$-Slump data), e is the exponential function and $\pi$ is the ratio of a circle's circumference to diameter.

The DDD curvilinear relationship can be derived using linear regression analytical methods, such as, for example, least squares methods on $\Delta$-$H_2O$ and $\Delta$-Slump data. Examples of linear regression methods for obtaining a profile or cure data will be discussed in further detail in the Examples at the end of this section. There exist many different regression and correlation techniques such as least-squares, supervised and unsupervised machine learning and others (see e.g., Shalev-Shwartz, S. and Ben-David, S., *Understanding Machine Learning: From Theory to Algo-*

*rithms*, Cambridge University Press, 2014), which can be utilized to derive a DDD curve, in accordance with the preference of the user.

In the case of the upper histogram in FIGS. 1 and 2, certain $\Delta$-$H_2O$ values were far above the bell-shaped distribution curve. The present inventors surmise that these high values, which can be seen to correspond to the clustered data points appearing on the left side of the graph (lower $\Delta$-$H_2O$ range below zero) illustrate the practice of "trimming" (withholding) water amounts at the time of concrete mix batching. For example, someone at the mix plant might trim a portion of batch water, e.g., 2 gallons per cubic yard (gpy) of concrete during initial batching (as a guess about the amount of water added during delivery and/or at the job site). However, the slump monitoring system used for monitoring the concrete in the truck mixer drum would not inject water in gallon increments but in more precise portions (e.g., 2.435 gpy). Hence, the larger spread of $\Delta$-$H_2O$ values, appearing especially at earlier ages and where $\Delta$-$H_2O$ is less than zero, would suggest that some standard deviation considerations along with standard curve normalization could be used in deriving a diagnostic delta data (DDD) curve for a given mix design.

The present inventors believe that the DDD curve established by paired ($\Delta$-Slump, $\Delta$-$H_2O$) values can be used for monitoring as well as adjusting concrete mixes and mix designs. The curve provides a useful way to discuss the curvilinear data relationship shown intersecting (0, 0) in FIGS. 1 and 2.

Figure 5:
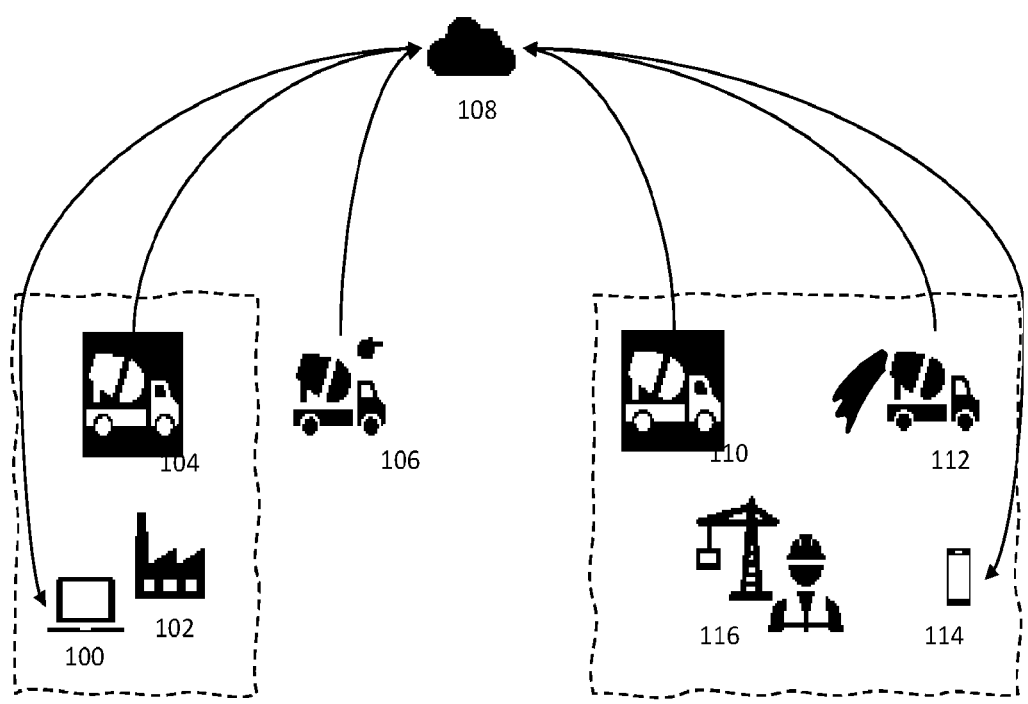
FIG. 5 is a plan diagram for illustrating various systems and methods of the invention for collecting, tracking, monitoring, and/or representing $\Delta$-Slump and $\Delta$-H$_2$O data pairs (illustratable as dots) and example adjustment protocols of the invention.

The graphs of FIGS. 1 and 2 illustrate quadrants (designated as at Q1, Q2, Q3, and Q4) as defined by the intersecting axes. These quadrants are helpful in facilitating discussions regarding the various adjustments to the concrete mixes and mix designs, depending on the relationship of paired ($\Delta$-Slump, $\Delta$-$H_2O$) values, and their relationship with the DDD curve intersection (0, 0) as shown in FIGS. 1 and 2. An exemplary method or system of the invention, comprises: collecting $\Delta$-Slump and $\Delta$-$H_2O$ data pairs from a plurality of delivered concrete loads using a slump monitoring device on at least one concrete delivery truck, deriving a DDD based on a curvilinear relationship of averaged and/or normalized $\Delta$-Slump, $\Delta$-$H_2O$ data pairs wherein, in at last one of the pairs, the target slump and target water content were met (e.g., wherein $\Delta$-Slump=$\Delta$-$H_2O$=zero (+/– 1.5 inches in the case of $\Delta$-Slump; (+/–1.5 gallons per cubic yard of concrete in the case of $\Delta$-$H_2O$; preferably 1.0, more preferably 0.50, most preferably 0.25 in either case)); and displaying, on a monitor or screen, the DDD curve intersecting two perpendicular axes (e.g., which intersect at 0, 0) and further displaying, in spaced relationship to the DDD curve, at least one $\Delta$-Slump, $\Delta$-$H_2O$ data point (preferably a plurality of such data points) obtained from a subsequent concrete mix load delivery, wherein at least one or both of the $\Delta$-Slump and $\Delta$-$H_2O$ values are less or greater than zero. Exemplary systems of the invention (as illustrated in FIG. 5, for example) may include at least one automated slump monitoring system on a concrete delivery truck (e.g., 104) to obtain slump and water content readings for delivered concrete mix loads (See e.g., 112) made from a mix design. While the processor of one or more slump monitoring systems (e.g., 104) might be sufficient to practice the invention, it is preferable to use a plurality of concrete deliveries, such as numerous trucks and/or truck deliveries (as represented by 104, 106, 110, 112), to enable $\Delta$-Slump and $\Delta$-$H_2O$ values to be collected in a central location, such as in the cloud or a central monitoring center (108) so that the illustration of the DDD curve and ($\Delta$-Slump, $\Delta$-$H_2O$) data pairs from subsequent deliveries can be displayed (See e.g., FIG. 2) such as by a portable screen device (114) at the construction site (116), by a screen device (100) at the batch plant (102); and/or even on a video screen of a slump monitoring system or handheld or other device available to a truck driver or drivers (104/106/110/112) as illustrated in FIG. 5, which uses dotted lines to suggest the respective batching plant (102) and delivery site (116) areas.

As shown in FIG. 2, the example DDD curve of FIG. 1 can be used for adjusting a concrete mix or mix design, depending upon $\Delta$-Slump and $\Delta$-$H_2O$ as might be obtained, for example, from a concrete mix during a current delivery or from recently delivered concrete loads. In other words, depending on where a dot (representing a $\Delta$-Slump, $\Delta$-$H_2O$ pair) falls on the graph within quadrants Q1, Q2, Q3, and Q4, and also whether the dot falls above or below the DDD curve within Q1 or Q4, one is able to adjust mix or mix design using an exemplary protocol in accordance with the present invention.

FIG. 3 is a table that summarizes for given $\Delta$-Slump, $\Delta$-$H_2O$ data pairs represented by various dots in FIG. 2. Discussion of exemplary adjustment protocols is facilitated by reference to the quadrants Q1, Q2, Q3, and Q4. The protocols involve, for example, adjustment of the amounts or proportions of cement, water, and/or plasticizer (e.g., chemical admixture of dispersing cement) in a concrete mix or mix design. (In some protocols, where cement cannot be added, a protocol may involve simply waiting for the concrete to hydrate over time).

Example Protocols: In the next paragraphs, example protocols are set forth depending on the quadrant containing the data point ($\Delta$-Slump, $\Delta$-$H_2O$) of interest. Although the DDD curves are derived based on individual loads (as shown in FIG. 1), the data point of interest is preferred to be an average or median of a collection of related data points (as shown in FIG. 2). For example, a collection of data points can incorporate all $\Delta$-Slump, $\Delta$-$H_2O$ data pairs obtained at a given event during the delivery. This may include events such as: "initial slump," which is the first slump value calculated by a slump monitoring system after batching (which requires the concrete to be mixed homogeneously); "leave plant," which is when the concrete mixer truck leaves the concrete production plant; "arrive site," which is when the concrete mixer truck arrives at the job site where the concrete will be discharged; or "discharge," which is when the concrete is discharged (which may occur multiple times during a delivery). For any of these events, the averaged $\Delta$-Slump and $\Delta$-$H_2O$ data pairs (i.e. average $\Delta$-Slump and average $\Delta$-$H_2O$) can be analyzed based on quadrant location and relationship to the DDD curve illustrated. In another example, a collection of data points can incorporate all data pairs ($\Delta$-Slump, $\Delta$-$H_2O$) obtained at a given event (e.g. at arrival at the construction site, at single or multiple discharge event(s)) for a given period of time. For example, all discharge events in the last two weeks can be averaged and analyzed based on quadrant location and relationship with the DDD curve. For the following discussion, the "dots" shown in FIG. 2 can represent single deliveries or averaged related deliveries.

Example Protocol Q1. For example, if a data pair ($\Delta$-Slump, $\Delta$-$H_2O$) is displayed (see e.g., dot designated as at 24 in FIG. 2) located on the quadrant graph "above" the DDD curve in Q1 (See e.g., upper right of graph in FIG. 2), then an exemplary protocol of the invention may involve decreasing water amount, plasticizer amount (e.g., cement dispersant chemical admixture), as well as cement amount in the concrete mix design (e.g., in the batching plant system computer) to reduce Δ-Slump and Δ-H$_2$O, and thereby to move the "dot" (24) closer to the target slump and water values (e.g., closer towards the situation wherein Δ-Slump=Δ-H$_2$O=zero). Where Δ-Slump, Δ-H$_2$O data pair values, as illustrated as dot (26 in FIG. 2) is shown located on the graph "below" the curve in Q1 (FIG. 2), an exemplary protocol of the invention may involve decreasing water and cement while increasing plasticizer amounts. These exemplary protocols could be used for adjusting portions of these components within the concrete mix design itself (as might be residing within the batch plant system processor and memory locations), and can be used by an onboard (the truck) slump monitoring system processor for adjusting the current concrete mix load being batched into a mixer drum (of batch mixer or truck mixer drum at the batching plant (e.g., FIG. 5 at 104). These adjustments are summarized in the first two lines of the chart in FIG. 3. Once the concrete delivery truck is in transit or already at the job site (e.g., FIG. 5 at 106, 110, 112), it is usually too late to add cement, unless provision is made for adding cement powder in the truck mixer drum during transit or at the site before discharge of the concrete from the truck mixer drum.

An alternative example Q1 protocol would be for the slump monitoring system to initiate a visual and/or audible alarm to indicate that discharge of the concrete mix load should be delayed so that the cement can have more time to hydrate and allow the concrete load to assume the target slump. A still further alternative example Q1 protocol would be for the slump monitoring system to deactivate the fluid delivery module (or some action such as defeating the ability to open a valve or activate an admixture pump) with respect to disallowing any further amounts of water or plasticizer to be introduced into the concrete load, since both the slump and water targets are exceeded.

Example Protocol: Q2. If Δ-Slump and Δ-H$_2$O data pair shown as dot (#20) is "below" the DDD curve (FIG. 2), an exemplary protocol involves decreasing water and cement while decreasing plasticizer. This adjustment can be made to the concrete mix design, or while batching a current load, and is summarized in FIG. 3, bottom row.

Example Protocol: Q3. If Δ-Slump, Δ-H$_2$O data pair shown as dot (#30) is "below" the DDD curve (FIG. 2), an exemplary protocol could involve increasing water, plasticizer, and cement so that delta values are moved towards target delta values. But if the Δ-Slump, Δ-H$_2$O pair shown by dot (#28) were above the DDD curve (FIG. 2), an exemplary protocol could involve increasing water and cement, while decreasing plasticizer. Both of these adjustments, better suited for mix design adjustments, are summarized in the fifth and fourth rows of the chart in FIG. 3.

Example Protocol: Q4. If Δ-Slump, Δ-H$_2$O data pair shown as dot (#22) above the DDD curve (See FIG. 2), an example protocol involves increasing water and cement, while decreasing plasticizer, such that Δ-Slump and Δ-H$_2$O are both adjusted towards the point at which Δ-Slump=Δ-H$_2$O=zero.

In each of these example protocols, changes in mix designs can be tracked and compared with past performance. Over time, the concrete producer can report to their customers or a government agency on carbon dioxide saved (in terms of cement reduction). For example, a net reduction of just 5 pounds of cement per delivery can add up to over a quarter of a million tons of carbon dioxide saved for a customer delivering 50,000 deliveries in a year.

As discussed above, exemplary methods and systems of the invention comprise generation of a DDD curve, and its visualization within a four-quadrant graph (defined by perpendicular axes wherein a first axis represents Δ-Slump and a second axis represents Δ-H$_2$O), wherein the DDD curve intersects at (0, 0); and wherein one or more Δ-Slump, Δ-H$_2$O data pairs, obtained from one or more deliveries of concrete mix loads made from the mix design, wherein at least one or both of the Δ-Slump, Δ-H$_2$O data pairs is not equal to zero.

In further exemplary methods and systems of the invention, the concrete mix or mix design can be adjusted, optionally in combination with displaying the DDD curve on a monitor in relation to one or more deliveries of the concrete wherein at least one or more of Δ-H$_2$O and Δ-Slump are not equal to zero.

Figure 4:
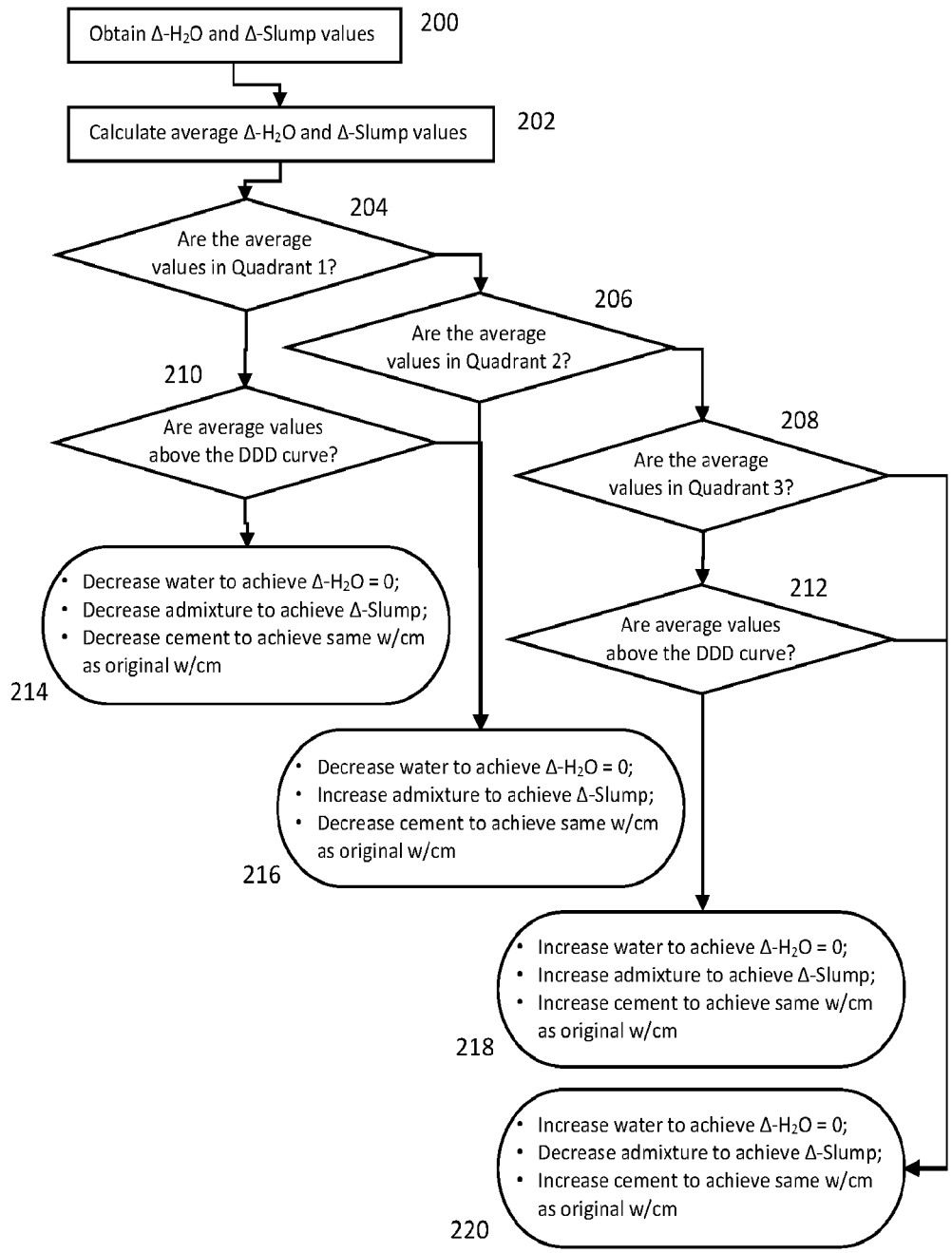
FIG. 4 is a diagram illustrating a DDD curve established when target values are met at least once (e.g., $\Delta$-Slump=$\Delta$-H$_2$O=zero); and the curve is shown intersecting both axes at (0, 0) to establish a "quadrant" for facilitating visualization of various adjustment protocols.

FIG. 4 is a diagram illustrating DDD curve shown intersecting at (0, 0) and thereby defining four quadrants (Q1, Q2, Q3, Q4) that visually facilitate discussion of exemplary monitoring and/or adjustment functions which are programmed into the processor of a batch mixer system, slump monitoring system, or other processor that can control the amounts of components in a concrete mix or the concrete mix design. By considering data-derived relationships based on particular water, plasticizer, or cement amounts known to achieve desired slump or water content levels, the present inventors believe that those of ordinary skill would be able to program the necessary adjustment steps required to reach a desired or target slump or water content. Thus, the four-quadrant illustration is used for describing exemplary monitoring and adjustment functions as described in the flow diagram of FIG. 4. At 200, one obtains at least one Δ-H$_2$O and Δ-Slump value, and more preferably a plurality of values, collected at a common event during a delivery of concrete mix (e.g., at discharge of concrete from the mixer drum) for a given mix design. Preferably, the plurality of values are related, for example, as obtained during the same week of production, or from the same concrete batch plant. At 202, if there are a plurality of data points, one can for example take the average Δ-H$_2$O and average Δ-Slump value to generate data pairs (Δ-Slump, Δ-H$_2$O) that can be plotted on a graph to achieve a diagnostic delta data (DDD) curve, thus defining four quadrants at the intersection of perpendicular axes (0, 0) as depicted in FIGS. 1 and 2; and, against this background of DDD curve and quadrant, there may be displayed and discussed other Δ-Slump, Δ-H$_2$O data pairs (illustrated as dots in FIG. 2, discussed above). Thus, as illustrated at 204 in FIG. 4, it is determined whether the Δ-Slump, Δ-H$_2$O data pair (illustratable as "dot" on the quadrant graph) resides in Quadrant 1 (Δ-H$_2$O>0, Δ-Slump>0); or, as illustrated at 206, whether the Δ-Slump, Δ-H$_2$O data pair resides in Quadrant 2 (Δ-H$_2$O>0, Δ-Slump<0); or, as illustrated at 208, whether the Δ-Slump, Δ-H$_2$O pair resides in 3 (Δ-H$_2$O<0, Δ-Slump<0); or, if none of the foregoing, whether the Δ-Slump, Δ-H$_2$O data pair is in Quadrant 4 (Δ-H$_2$O<0, Δ-Slump>0). Then, as designated as at 210 in FIG. 4, it is determined whether the Δ-Slump, Δ-H$_2$O data pair is in Quadrant 1, and if the Δ-Slump, Δ-H$_2$O data pair is above the DDD curve. As designated at 212, if the Δ-Slump, Δ-H$_2$O pair is in Quadrant 3, then it is determined if Δ-Slump, Δ-H$_2$O pair is above the DDD curve. As designated at 214, if the Δ-Slump, Δ-H$_2$O data pair is in Quadrant 1 and is above the DDD curve, water content is decreased to achieve the state wherein Δ-H$_2$O=0, plasticizer is decreased to the state where Δ-Slump=zero, and cement amount is decreased to achieve the same water-to-cement ratio as original w/c. In other words, before the adjustments of water and cement, the original w/c might be 0.5 (e.g., 300 pounds of water divided by 600 pounds of cement). With the decrease in water (e.g. 280 pounds of water), the ratio will decrease (e.g., to 0.47). Therefore, one may adjust the cement downwards until the 0.5 w/c is again achieved (e.g., 560 pounds of cement). As designated at 216, if the Δ-Slump, Δ-H$_2$O data pair is in Quadrant 1 and below the DDD curve, or, if the Δ-Slump, Δ-H$_2$O data pair is in Quadrant 2, water is decreased to achieve the state wherein Δ-H$_2$O=0, plasticizer amount is increased to achieve Δ-Slump=0; and cement amount is decreased achieve the same water to cement ratio (w/c) as original w/c. As designated at 218, if the Δ-Slump, Δ-H$_2$O data pair is in Quadrant 3 and above the DDD curve, water amount is increased to achieve the state wherein Δ-H$_2$O=0, plasticizer is increased to the state wherein Δ-Slump=0, and cement is increased to achieve the same water to cement ratio (w/c) as original w/c. As designated at 220, if the Δ-Slump, Δ-H$_2$O data pair is in Quadrant 3 and is below the DDD curve, or, if the Δ-Slump, Δ-H$_2$O data pair is in Quadrant 4, water is decreased to the state at which Δ-H$_2$O=0, plasticizer is increased to the state wherein Δ-Slump=0, and cement is decreased to achieve same water-to-cement ratio (w/c) as original w/c.

FIG. 5 illustrates exemplary systems for monitoring and/or adjusting cement mix loads or mix designs in accordance with the present invention, by generating a DDD curve derived from Δ-Slump, Δ-H$_2$O data pairs obtained from deliveries of concrete loads made from a mix design, wherein the concrete is delivered by at least one concrete delivery trucks having automated slump monitoring system (as designated at 104, 106, 110 and 112). The delivery begins at a batch plant (designated at 102 within the dotted line at the left of FIG. 5). Once the concrete is batched and mixed, an initial slump can be determined by the slump monitoring system, representing a specific event that can be analyzed according to the exemplary embodiments of the present invention. After batching, the truck will leave the site, as depicted by 106 as it leaves the batch plant, and enters onto the construction property (designated at 110 within the dotted line at the rights of FIG. 5) and up to the event at which the concrete is discharged (116) at the construction site. In preferred embodiments, a plurality of deliveries and/or delivery trucks (104, 106, 110, 112) are employed having slump monitoring systems to capture slump data and water content data, so that Δ-Slump, Δ-H$_2$O data pairs can be calculated by a central computer processor or processors (such as designated by the cloud icon (10)). The DDD curve can be generated, for example, by processing preferably within the cloud, or alternatively by using a processor at the batch plant or slump monitoring system processor. Graphic illustrations of the DDD curve, quadrants (Q1-Q4), and Δ-Slump, Δ-H$_2$O data pair (illustratable as dots) can be illustrated on a screen monitor, such as on a project manager's smart phone device at the site (114), on the screen of an automated slump monitoring system on board the trucks (104, 106, 110, 112), and/or on the screen at the concrete producer's batch plant processor system (100).

Example method and system features of the present invention, with various exemplary aspects, are now described.

In a first exemplary embodiment, the present invention a method for adjusting a concrete mix load or mix design (A) batching at least one concrete mix load using a concrete mix design, into a concrete mixer drum, and calculating for the at least one concrete mix load a delta slump value (Δ-Slump) and a delta water content value (Δ-H$_2$O) wherein:
  i. Δ-Slump value is calculated as a difference (e.g., subtractive difference or ratio) between a target slump value (e.g., as set forth in a batch ticket) for the at least one concrete mix load and the slump value obtained for the at least one concrete mix during delivery thereof from the batch plant to a construction site (e.g., at batching at the plant, leaving the batch plant, arriving at the construction site, during one or more discharge events at the construction site); and
  ii. Δ-H$_2$O value is calculated as a difference (e.g., subtractive difference or ratio) between a target maximum water content (e.g., as forth in a batch ticket, received from concrete producer or its batch processor, received from dispatch center) for the at least one concrete mix load and the water content value as determined for the concrete mix during delivery thereof from the batch plant to a construction site;

(B) comparing the obtained Δ-Slump and Δ-H$_2$O with a diagnostic delta data curve defined by at least two data points, wherein each of the at least two data points is based on at least one concrete load delivery wherein both slump and water content targets are met (e.g., wherein Δ-Slump and Δ-H$_2$O are equal to zero where the delta values are calculated using differences or wherein Δ-Slump and Δ-H$_2$O are one where the delta values are calculated using ratios) (e.g., +1-1.5 inches in the case of Δ-Slump or (+/−1.5 gallons per cubic yard of concrete in the case of Δ-H$_2$O in the case of subtractive differences), and wherein at least one other data point concerns at least one concrete load delivery wherein at least one or both of the slump and water contents are not met (e.g., wherein at least one of Δ-Slump and Δ-H$_2$O are less or greater than zero where the delta values are calculated using differences or wherein at least one of Δ-Slump and Δ-H$_2$O are less or greater than one where the delta values are calculated using ratios); and (C) adjusting, or providing an indication of adjustment to, at least one of the following properties chosen from: slump, water content, cement content, chemical plasticizer content, aggregate content, or a combination thereof, in the at least one concrete mix load or a concrete mix design from which the at least one concrete mix load was batched, and delivering the at least one concrete mix load at a construction site after the adjustment is made to the mix load or batching at least one concrete mix load using the adjusted concrete mix design after the adjustment is made.

Various exemplary aspects of this first example embodiment can include additional features and conditions.

In a first aspect of the first exemplary embodiment, in step C, the step of adjusting or providing an indication of adjustment to one of the properties of a concrete mix load contained in a truck mixer drum, may include, for example in the event that Δ-Slump and Δ-H$_2$O are calculated based on differences between target values and monitored values, and both L-Slump and Δ-H$_2$O are determined to be greater than zero, having the slump monitoring system initiate an alarm, signal, or instructions to a project manager or truck driver, advising that a certain time should pass before discharging the concrete from the truck, so that slump of the concrete can be allowed to decrease to target value.

In a second aspect of the first exemplary embodiment, a sensor used for calculating slump of the concrete mix load is a hydraulic pressure sensor or force sensor effective for measuring the energy associated with rotating, or required to rotate, the mixer drum containing the concrete mix load. (e.g., sensors commercially available from Verifi LLC, I. B.

B. Rheologie, and others). In preferred exemplary embodiments, the use of a hydraulic pressure sensor in combination with a drum rotation speed sensor is preferred. However, in other exemplary embodiments, electronic sensors can be used to monitor electrical energy required by or associated for motors that rotate the mixer drums as well as for monitoring the rate of turning. Electricity powered mixer drums have been disclosed by Lieberr (see e.g., https://www.electrive.com/2020/03/29/liebherr-presents-electric-concrete-mixer-truck).

In a third aspect of the first exemplary embodiment, a sensor used for determining water content comprises a flow meter, valve, or combination thereof on the delivery truck, and these communicate with a processor that calculates amount of water added into the concrete mix load transported on the truck during delivery of the concrete. For example, the processor of an automated slump monitoring system can be programmed to record the amount of water initially batched into the concrete load at the plant and also to record the amount of water introduced into the transported concrete load during delivery, as sensed by the onboard flow meter, and/or as sensed by the slump monitoring system.

In a fourth aspect of the first exemplary embodiment, the phrase "providing an indication of adjustment to" as set forth in sub-part "C," comprises sending a message (such as by system processor) to a mobile communication device at the construction site, to the truck driver who is delivering the particular concrete load, or both, that the discharge of concrete load should be postponed to enable slump to decrease to attain target slump value; this would arise in the situation where $\Delta$-Slump and $\Delta$-$H_2O$, as calculated based on differences between target values and monitored values, were both found to be greater than zero (thus in quadrant 1).

In a fifth aspect of the first exemplary embodiment, it is optional to use a "sneak water" detection program for monitoring water additions into the concrete mix load in the mixer drum. Such "sneak water" detection program can also calculate the amount of water sourced from off of the concrete delivery truck (e.g., not pumped or metered into the drum through the valve or flow meters on the truck). An example of an optional "sneak water" detection process and system is disclosed in U.S. Pat. No. 9,466,203 of Jordan et al. (owned by GCP Applied Technologies of Cambridge MA).

In a sixth aspect of the first exemplary embodiment, an optional "grey water" detection program for measuring wash-out water in the mixer drum can be used so as to increase accuracy of measuring water content in a batched concrete load. See e.g., WO 2019/032820 A1.

In a seventh aspect of the first exemplary embodiment, the method optionally includes a process or method for measuring the amount of moisture contained in aggregates used for making concrete in the mixer drum. The amount of aggregate moisture can be measured, and this can optionally be included in the water content calculated for a concrete mix load in the mixer drum. For example, in US Publication No. 2020/0018741, there is disclosed a method for calibrating aggregate moisture sensors used in hoppers or conveyor belts at concrete mix plants by monitoring, using an automated slump monitoring system, the slump of concrete slurry mix that is batched from the aggregates.

In an eighth aspect of the first exemplary embodiment, the method includes recording when and what changes to mix or mix design have occurred. This can be done by the processor of a slump monitoring system on a truck which receives mix design information from a concrete producer's batching system processor, and this information can be transmitted to one or more processors in the cloud for use by other slump monitoring systems that are in communication with the cloud. This enables a concrete producer, slump monitoring system manager, or construction site manager to keep a history of changes which can help identify trends or anomalies in the data. For example, changes in water demand can occur with seasonal temperature swings (e.g. from summer to winter). Keeping track of both the ambient temperature over time as well as when major changes in water demand have occurred can help prepare the producer to make similar changes in the future. This data can also be useful in case an issue arises with the strength or durability of the concrete, and allow review of whether concrete was managed properly.

In a second exemplary embodiment, which can be based on the first exemplary embodiment, the present invention provides a method wherein, in step (A), a plurality of concrete mix loads are batched and delivered, and, in step (B), the diagnostic delta data curve is defined by a plurality of data points from the plurality of concrete mix load deliveries (from batch plant to discharge event at construction site), wherein at least one of the data points is based on both slump and water content targets being met (e.g., defined by a pair of $\Delta$-Slump and $\Delta$-$H_2O$ values, each of which is calculated based on differences between target values and monitored values during delivery, and where at least one slump and water content met target values, e.g., $\Delta$-Slump=$\Delta$-$H_2O$=zero; or are calibrated to equal zero). This example is based on using the differences between target and monitored values within a margin of error, e.g., +/−1.5 inches (in the case of $\Delta$-Slump) and gallons per cubic yard (in the case of $\Delta$-$H_2O$), preferably +/−1.0, more preferably +/−0.50, and most preferably +/−0.25). When considering the differences of target values and monitored values in terms of ratios (e.g., the monitored values divided by the target values), the margin of error can be represented as fractions or percent, which will rely on the target value (e.g. a 25% margin of error for an 8 inch slump is 2 inches, but a margin of error of only 1 inch for a 4 inch slump).

In a first aspect of the second exemplary embodiment, which may be based on the first exemplary embodiment, the diagnostic delta data curve is preferably formulated using a regression method (e.g., linear regression, non-linear regression, machine learning) using $\Delta$-Slump and $\Delta$-$H_2O$ values from concrete mix deliveries where at least one $\Delta$-Slump and $\Delta$-$H_2O$ pair during the concrete mix delivery intersects (0, 0) in the case of subtractive differences and (1, 1) in the case of ratios. In further aspects, the at least one $\Delta$-Slump and $\Delta$-$H_2O$ pair during the concrete mix delivery is within 1.5 inches in the case of $\Delta$-Slump or 1.5 gallons per cubic yard in the case of $\Delta$-$H_2O$, preferably 1.0, more preferably 0.50 and most preferably 0.25 in the case of subtractive differences. In the case where the difference is determined using ratios, the fraction or percent margin of error will depend on the divisor (the target value) and can substantially differ from case to case.

In a second aspect of the second exemplary embodiment, the plurality of data points preferably comprises at least ten deliveries of concrete loads made from the same mix design, and more preferably at least twenty deliveries of concrete loads made from the same mix design. Drawing from a greater number of actual deliveries will allow for a more accurate set of curve data. In further aspects, the plurality of data points preferably comprises deliveries of concrete loads that are similar to the mix design.

In a third aspect of the second exemplary embodiment, data collected more recently is weighted higher than data collected less recently during the application of the regression method (i.e. more recent data contribute more to the final regression than less recent data, thus having more impact on the final regression).

In a fourth aspect of the second exemplary embodiment, the plurality of data points drawn from a number of deliveries of the concrete mix load is stored in the cloud, or other remote memory location, and is accessed by an automated slump monitoring system processor which monitors the concrete mix load.

In a third exemplary embodiment, which can be based on any of the first through second exemplary embodiments, the present invention provides a method wherein, in the adjusting step (C), the adjustment is initiated by a concrete slump monitoring system based on the concrete delivery truck or by a concrete batching system at the batch plant, wherein a system processor accesses a collection of protocols for adjusting the concrete mix or mix design based on whether one or both Δ-Slump and Δ-H$_2$O, calculated based on the differences between target and monitored values, is or are greater or less than zero (in the case of subtractive differences; one in the case of ratios), and initiates at least one adjustment to the concrete mix or mix design or otherwise initiates an indication (e.g., a visual or audible alarm to the concrete producer, or to a dispatch center, or to slump monitoring system supervisor, etc.) to the effect that the concrete mix or concrete mix design requires that at least one adjustment be made.

The term "protocol" is used in a general sense to refer to rules, procedures, and/or data, or combination thereof, as used within a device or transferred between devices or locations. For example, a "collection of protocols" could refer to different instructions for the batching system processor (e.g., at the concrete producer's batch plant) or slump monitoring processor (e.g., as based on the delivery truck) depending on Δ-Slump or Δ-H$_2$O. For example, if for a given delivery, Δ-Slump and Δ-H$_2$O (calculated based on subtractive differences between target and monitored values) were each greater than zero, meaning that the concrete was more flowable or workable (much higher slump) than what was desired or targeted, and an excess of water was added to the current delivery; then it would not be desirable (or wise) to employ a protocol for the given delivery that would involve the introduction of additional water or even chemical plasticizer which would make the concrete even more flowable. An appropriate example protocol would be for the system processor to initiate other actions, such as initiating an indication, such as a visual or audible alarm, or a message to a hand-held device, such as to a monitor of a truck driver or an on-site project manager, to delay pouring the concrete.

As another aspect of the above third exemplary embodiment, one may consider that, if, for a given mix design, a majority of Δ-Slump and Δ-H$_2$O from multiple deliveries were each greater than zero (for example, the average value for Δ-Slump and the average value for Δ-H$_2$O were greater than zero in the case of subtractive differences; one in the case of ratios), an appropriate exemplary protocol would be for the system processor to initiate other actions, such as an indication that slump was too high, e.g., alarm, warning sent to a smart phone device, such as to the manager at the construction site (See e.g., FIG. 5 at 116, 114) or reducing water content from the mix design which would decrease slump (See e.g., FIG. 5 at 100, 102). In the case that water is reduced, the slump will also decrease. After the water is reduced, the resulting slump will be above target, below target or right on target. If the resulting slump is below the target, an appropriate amount of plasticizer can be added to the mix design to bring the slump up to target (e.g., at the batch plant). If the resulting slump is above the target, an appropriate amount of plasticizer can be removed from the mix design to bring the slump down to target. If the majority of Δ-Slump and Δ-H$_2$O data points resided above the DDD curve, it may be likely that the resulting slump will be above target after reduction of water content in the mix design. To the contrary, if the majority of Δ-Slump and Δ-H$_2$O values lies below the DDD curve, it is likely that the resulting slump will be below target after reduction of water content in the mix design. Thus, the DDD curve is a helpful visual indicator. Where water is decreased, overall strength of the resultant concrete may increase; and, in such situation, the amount of cement can be reduced to save on cost as well as to decrease the carbon effect of cement manufacture on the environmental.

In another aspect of the third exemplary embodiment, if the concrete being delivered with a plurality (majority) of Δ-Slump and Δ-H$_2$O not equal to zero (in the case of subtractive differences; one in the case of ratios), the concrete producer (e.g., batch plant) could change the respective targets so that the adjusted Δ-Slump and Δ-H$_2$O values are zero (in the case of subtractive differences; one in the case of ratios). In this case, the concrete producer most likely will change the price of the mix design. If the concrete producer was consistently making concrete with a target slump of 5 inches but was +3 inches over the target and using 30 gallons of water (so that water content was 2 gallons below the maximum), and the contractor favors such product (while not really obtaining what was theoretically ordered by way of concrete mix properties, instead of adjusting component proportions of the batched product, the producer could alter the targets of the mix design. This means that now the target values are 5+3=8" (slump in inches) and 30−2=28 (water content in gallons), and the resulting new Δ-Slump and Δ-H$_2$O values are both set to zero (in the case of subtractive differences; one in the case of ratios).

In a fourth exemplary embodiment, which can be based on any of the first through third exemplary embodiments, the present invention provides a method wherein a concrete mix is detected to have both Δ-Slump and Δ-H$_2$O greater than zero, (in the case of subtractive differences; one in the case of ratios) where these delta values are calculated based on the differences between target values and monitored values, and a processor (e.g., the processor of a slump monitoring system on delivery truck) initiates an indication that adjustment needs to be made to the mix design to the effect that discharge of concrete contained in the mixer drum of a concrete delivery truck should be delayed to allow for slump of the load to decrease over time (See e.g., FIG. 5 at 110).

In a first aspect based on the fourth exemplary embodiment, if it is found that a plurality of Δ-Slump and Δ-H$_2$O values are greater than zero (in the case of subtractive differences; one in the case of ratios), one of the system processors (e.g., slump monitoring system on delivery truck) can be programmed or configured to initiate an indication, e.g., alarm, suggestion on a mobile device screen, such as at the batch plant (See e.g., FIG. 5 at 100, 102); or construction site manager hand-held screen (See e.g., FIG. 5 at 110, 114) to decrease water content, admixture content, cement content, or some combination thereof in a concrete mix load or in the mix design.

In a second aspect based on the fourth exemplary embodiment, other protocols can be initiated based on reference of Δ-Slump and Δ-H$_2$O values as monitored on the concrete mix loads and compared to the DDD curve information: such as (1) using the DDD to determine the amount of water to decrease; (2) decreasing both water and admixture if the plurality of Δ-Slump and Δ-H$_2$O values are greater than zero (in the case of subtractive differences; one in the case of ratios); (3) decreasing water and increasing admixture if the plurality of Δ-Slump and Δ-H$_2$O values are less than zero (in the case of subtractive differences; one in the case of ratios); (4) taking the average or median or mode of the Δ-Slump and Δ-H$_2$O values and determining if the average, median, mode or combination thereof are greater than zero (in the case of subtractive differences; one in the case of ratios) and moreover to determine if those values are above or below DDD, or a combination thereof.

In a fifth exemplary embodiment, which can be based on any of the first through fourth exemplary embodiments, the present invention provides a method wherein, when a concrete mix is detected to have both Δ-Slump and Δ-H$_2$O less than zero (in the case of subtractive differences; one in the case of ratios), where these delta values are calculated based on the differences between target values and monitored values, a processor initiates an adjustment to a concrete mix or mix design to the effect that more water or plasticizer is added into a concrete mix or included into a concrete mix design (e.g., so that the next batch of concrete made will be closer to target values); or a processor initiates an indication or adjustment that more water or chemical plasticizer should be added into future concrete mix loads or into the concrete mix design. For example, the processor of a slump monitoring system on board a concrete delivery truck or in the cloud can be programmed to send the indication or adjustment information to the processor of the batch plant computer system. (See e.g., FIG. 5, truck slump monitoring systems at 166/110/112 in communication with the cloud (108) system or processor(s) which system processor(s) which communicate with the batch plant system processor(s) designated at (100, 102).

In a first aspect based on the fifth exemplary embodiment, the processor of a slump monitoring system determines Δ-Slump and Δ-H$_2$O values for a load of concrete delivered or being delivered; and, by or before the time the concrete delivery truck returns to the batch plant, the processor communicates with a batch plant operator or processor, such as providing a visual or audible alert or instructions regarding adding more water, plasticizer, or both, so that these can be adjusted and administered into the next concrete load or loads to be batched into a delivery truck. (See e.g., FIG. 5, and foregoing discussion of relationship between truck-based monitoring system processor(s)) and batch system processor(s)) and possible communication to monitor screen at site, as connected through processors in the cloud).

In a second aspect based on the fifth exemplary embodiment, where a plurality of Δ-Slump and Δ-H$_2$O values are less than zero (in the case of subtractive differences; one in the case of ratios) for the concrete mix design, a processor (of the batch or truck-based slump monitoring system) initiates an indication to increase the water content, plasticizer content, cement content, or a combination thereof into the concrete mix or mix design.

In a third aspect based on the fifth exemplary embodiment, other protocols can be initiated based on reference of Δ-Slump and Δ-H$_2$O values as monitored for concrete mix loads and compared to the DDD curve information: (1) using the DDD curve to determine the amount of water to increase; (2) increasing both water and plasticizer if the plurality of Δ-Slump and Δ-H$_2$O values are less than zero (in the case of subtractive differences; one in the case of ratios); (3) increasing water and decreasing plasticizer if the plurality of Δ-Slump and Δ-H$_2$O values are less than zero (in the case of subtractive differences; one in the case of ratios); (4) taking the average or median or mode of the Δ-Slump and Δ-H$_2$O values and determining if the average, median, mode or combination thereof are less than zero (in the case of subtractive differences; one in the case of ratios) and moreover to determine if those values are above or below DDD, or a combination thereof.

In a sixth exemplary embodiment, which can be based on any of the first through fifth exemplary embodiments, the present invention provides a method wherein, when a concrete mix is detected to have Δ-Slump>0 (in the case of subtractive differences; 1 in the case of ratios) and Δ-H$_2$O<0 (in the case of subtractive differences; 1 in the case of ratios), where these delta values are calculated based on the differences between target values and monitored values, a processor initiates an indication that pouring of a concrete mix load in a delivery truck mixer drum should be delayed to allow for slump of the load to decrease over time; or, alternatively, initiates an indication that an adjustment should be made in the concrete mix design, or otherwise initiates an adjustment, the adjustment being chosen from changing water content or chemical plasticizer amount or relative proportions thereof (and, optionally, changing amounts or relative proportions of, cement content, aggregate content, or combination thereof).

In a first aspect of the sixth exemplary embodiment, where a plurality of Δ-Slump values>0 (in the case of subtractive differences; 1 in the case of ratios) and Δ-H$_2$O values<0 (in the case of subtractive differences; 1 in the case of ratios) for the mix design, a processor initiates an indication to increase the water content, decrease plasticizer content, increase cement content, or combination thereof. (See e.g., FIG. 5, and foregoing discussion of relationship between truck-based monitoring system processor(s)) and batch system processor(s)) and possible communication to monitor screen at site, as connected through processors in the cloud).

In a second aspect of the sixth exemplary embodiment, other protocols can be initiated based on reference of Δ-Slump and Δ-H$_2$O values as monitored on the concrete mix loads and compared to the DDD curve information: (1) using the DDD to determine the amount of water to increase; (2) taking the average or median or mode of the Δ-Slump and Δ-H$_2$O values and determining if the average, median, mode or combination thereof are less than zero or greater than zero (in the case of subtractive differences; one in the case of ratios), or a combination thereof.

In a seventh exemplary embodiment, which can be based on any of the first through sixth exemplary embodiments, the present invention provides a method wherein, when a concrete mix is detected to have Δ-Slump<0 (in the case of subtractive differences; 1 in the case of ratios) and Δ-H$_2$O>0 (in the case of subtractive differences; 1 in the case of ratios), where these delta values are calculated based on the differences between target values and monitored values, a processor initiates an indication that an adjustment to the concrete mix or mix design should be made, or otherwise makes an adjustment to the concrete mix or mix design, the adjustment comprising adding plasticizer, adding aggregate, adding cement, or combination thereof.

In a first aspect of the seventh exemplary embodiment, where a plurality of Δ-Slump values<0 (in the case of subtractive differences; 1 in the case of ratios) and Δ-H$_2$O values>0 (in the case of subtractive differences; 1 in the case of ratios) for the same (or similar) mix design, a processor initiates an indication to decrease water content, increase plasticizer content, decrease cement content, or to achieve a combination thereof. (See e.g., FIG. 5, and foregoing discussion of relationship between truck-based monitoring system processor(s)) and batch system processor(s)) and possible communication to monitor screen at site, as connected through processors in the cloud).

In a second aspect based on the seventh exemplary embodiment, the processor initiates a protocol to adjust a concrete mix or mix design, based on reference of $\Delta$-Slump and $\Delta$-$H_2O$ values, as monitored on the concrete mix loads and compared to the DDD curve information: (1) using the DDD to determine the amount of water to decrease; (2) taking the average or median or mode of the $\Delta$-Slump and $\Delta$-$H_2O$ values and determining if the average, median, mode or combination thereof are less than or greater than zero (in the case of subtractive differences; one in the case of ratios), or a combination thereof.

In an eighth exemplary embodiment, which can be based on any of the first through seventh exemplary embodiments, the present invention provides a method wherein, at least three protocols are (stored in memory accessible to the processor of a batching plant or monitoring system or in the cloud) available for access by a processor of a batching or slump monitoring system, the protocols comprising at least one adjustment or indication that an adjustment needs to be made to a mix or mix design, relative to where (A) both $\Delta$-Slump and $\Delta$-$H_2O$ are >0 (in the case of subtractive differences; 1 in the case of ratios); (B) both $\Delta$-Slump and $\Delta$-$H_2O$ are <0 (in the case of subtractive differences; 1 in the case of ratios); and (C) $\Delta$-Slump<0 (in the case of subtractive differences; 1 in the case of ratios) and $\Delta$-$H_2O$>0 (in the case of subtractive differences; 1 in the case of ratios), or $\Delta$-Slump>0 (in the case of subtractive differences; 1 in the case of ratios) and $\Delta$-$H_2O$<0 (in the case of subtractive differences; 1 in the case of ratios); where these delta values are calculated based on the differences between target values and monitored values; and wherein the processor accesses and executes at least one of said protocols depending upon whether one or both $\Delta$-Slump and $\Delta$-$H_2O$ are greater or equal to zero (in the case of subtractive differences; one in the case of ratios).

In a ninth exemplary embodiment, which can be based on any of the first through eighth exemplary embodiments, the present invention provides a method wherein $\Delta$-Slump and $\Delta$-$H_2O$ is calculated for a current delivery concrete mix load, where these delta values are calculated based on the differences between target values and monitored values, and based on a comparison with the DDD curve for the mix design, a processor sends a warning or an indication to a concrete batch plant operator or batching system processor that the concrete mix design requires adjustment, the adjustment comprises at least one change to water content, plasticizer, cement, aggregates, or combination thereof, or to relative proportions of any of the foregoing components, whereby subsequent concrete loads batched from the mix design are determined to have an adjustment of $\Delta$-Slump, $\Delta$-$H_2O$, or both towards the state wherein $\Delta$-Slump or $\Delta$-$H_2O$ or both values are closer to zero (in the case of subtractive differences; one in the case of ratios).

This exemplary embodiment relates to making or recommending "incremental" adjustments to the concrete mix load or mix design. The present inventors believe that there may be production situations in which large changes should be avoided, such as water content changes that might arise to sudden rainfalls, or traffic delays on extremely hot days. Accordingly, the change required in the underlying concrete mix design might not be as necessary as an automated slump monitoring device system empirically (in the moment) interprets it to be. As more data is acquired after many monitored deliveries, the present inventors believe that the adjustments of the concrete mix or mix designs will be more accurate. Thus, for example, a monitoring system processor (or processors in the cloud with which it may be in communication) can communicate to a processor in the concrete producer's batching system to automatically make changes based on a predefined "increments" for concrete constituents (e.g. 10 pcy (pounds per cubic yards of concrete) of cement, 0.5 gpy (gallons per cubic yard of concrete) of water, 0.2 oz/cwt (fluid ounces per 100 pounds of cement) of admixture and sends an indication that a change was made automatically.

In a tenth exemplary embodiment, which can be based on any of the first through ninth exemplary embodiments, the present invention provides a method wherein a diagnostic delta data curve is visually illustrated on a screen device, intersecting two perpendicular axes defining four quadrants, wherein a first quadrant corresponds to $\Delta$-Slump>0 (in the case of subtractive differences; 1 in the case of ratios) and $\Delta$-$H_2O$>0 (in the case of subtractive differences; 1 in the case of ratios); a second quadrant corresponds to $\Delta$-Slump>0 (in the case of subtractive differences; 1 in the case of ratios) and $\Delta$-$H_2O$<0 (in the case of subtractive differences; 1 in the case of ratios); a third quadrant corresponds to $\Delta$-Slump<0 and $\Delta$-$H_2O$<0 (in the case of subtractive differences; 1 in the case of ratios); and a fourth quadrant corresponds to $\Delta$-Slump<0 (in the case of subtractive differences; 1 in the case of ratios) and $\Delta$-$H_2O$>0 (in the case of subtractive differences; 1 in the case of ratios); and wherein these delta values are calculated based on the differences between target values and monitored values.

In a first aspect of this tenth exemplary embodiment, an example of a screen device includes a mobile phone screen, lap top screen, or other electronic device.

In an eleventh exemplary embodiment, which can be based on any of the first through tenth exemplary embodiments, the present invention provides a method wherein the diagnostic delta data curve is illustrated as intersecting both the vertical axis and horizontal axis at a common point. As shown in FIG. 2, the diagnostic delta data curve is shown intersecting at a common point (0, 0) where the difference is calculated as a subtractive difference. For cases where ratios are used, the common point would lie at (1, 1).

In a twelfth exemplary embodiment, which can be based on any of the first through eleventh exemplary embodiments, the present invention provides a method wherein an automated slump monitoring system detects that $\Delta$-Slump exceeds 5 inches, and $\Delta$-$H_2O$ exceeds 5 gallons per yard of concrete (more preferably 3 inches or gpy, and most preferably 1 inch or gpy), where these delta values are calculated based on the differences between target values and monitored values, and the slump monitoring system sends an indication to a concrete plant operator to adjust the concrete mix design and illustrates the monitored $\Delta$-Slump and $\Delta$-$H_2O$ values as a data point on the diagnostic delta data curve illustrated as intersecting both the vertical axis and horizontal axis at a common point, and the data point is shown as plotted as non-coinciding with the diagnostic delta data curve.

In a first aspect of this twelfth exemplary embodiment, the monitoring system can also communicate to another processor (e.g., batch system processor) to automatically make a change (to the concrete mix or mix design).

In a thirteenth exemplary embodiment, which can be based on any of the first through twelfth exemplary embodiments, the present invention provides a method wherein at least one data point is illustrated with respect to the diagnostic delta data curve on a monitor screen, wherein the method further comprises providing an interactive data retrieval function whereby a user touches the monitor screen at one of the four quadrant locations defined by the intersecting vertical and horizontal axis, thereby activating data retrieval which data comprises a concrete producer's concrete mix data information on the monitor screen.

In a first aspect of this thirteenth exemplary embodiment, data retrieval includes data concerning the available inventory of the concrete producer, chosen from cement type or amount, plasticizer type or amount, aggregate type or amount, or combinations thereof. For example, the user can decide how a can be adjusted in view of the inventory at hand. This provides on-the-fly adjustment capabilities for experience concrete producers. Such ability to call up inventory at hand may also allow a project manager to visualize different adjustment possibilities to a concrete producer. Such visualization of the four quadrants and the diagnostic delta data curve can be provided to a number of involved parties at once, from the concrete producer, to the project manager, etc., to permit fine tuning of the concrete mix or mix design.

In a fourteenth exemplary embodiment, which can be based on any of the first through thirteenth exemplary embodiments, the present invention provides a system comprising: at least one slump monitoring system for monitoring slump and water content and additions in a concrete mix load contained in rotatable mixer drums on concrete delivery trucks, the system having sensors for monitoring slump and water additions introduced into the concrete load, the sensors communicative with a slump monitoring system processor, characterized in that the processor is configured or programmed to perform the method according to any of claims one through fourteen. See e.g., FIG. 5, and foregoing discussion of relationship between truck-based monitoring system processor(s)) and batch system processor(s)) and possible communication to monitor screen at site, as connected through processors in the cloud.

In a fifteenth exemplary embodiment, the invention provides a method for effectuating or improving processor-driven adjustment to a concrete mix design or concrete mix design, comprising:

(A) collecting slump and water content data, using at least one slump monitoring system, from a plurality of deliveries of concrete mix loads made from a concrete mix design;

(B) calculating delta slump value ($\Delta$-Slump) and a delta water content value ($\Delta$-H$_2$O) for the plurality of deliveries, wherein: $\Delta$-Slump value is calculated as a difference (e.g., subtractive difference or ratio) between a target slump value (e.g., as set forth in a batch ticket) for the at least one concrete mix load and the slump value obtained for the at least one concrete mix during delivery thereof from the batch plant to a construction site (e.g., during transit from the batch plant to the construction site, during discharge/pour); and $\Delta$-H$_2$O value is calculated based as a difference (e.g., subtractive difference or ratio) between a target or maximum water content (e.g., as forth in a batch ticket, received from concrete producer or its batch processor, received from dispatch center) for the at least one concrete mix load and the water content value as determined for the concrete mix during delivery thereof from the batch plant to a construction site;

(C) establishing a diagnostic delta data curve defined by at least two data points selected from data obtained from the plurality of concrete deliveries, at least one data point of which contains $\Delta$-Slump=$\Delta$-H$_2$O=zero (+/−1.5 inches in the case of $\Delta$-Slump, +/−1.5 gallons per cubic yard of concrete in the case of $\Delta$-H$_2$O), preferably 1.0, more preferably 0.50, most preferably 0.25 in either case) (in the case of subtractive differences; $\Delta$-Slump=$\Delta$-H$_2$O=one in the case of ratios), and wherein the at least one other data point concerns at least one concrete load delivery wherein at least one of $\Delta$-Slump and $\Delta$-H$_2$O (and more preferably both) are less or greater than zero (in the case of subtractive differences; one in the case of ratios); and wherein the delta values are calculated based on differences between target values and monitored values; and (D) adjusting a concrete mix or mix design based on a comparison of $\Delta$-Slump and $\Delta$-H$_2$O of a concrete mix load delivery with the diagnostic delta data curve, the adjustment being made in terms of cement, plasticizer, or cement amount or proportion with the concrete mix or mix design; and (E) making or adjusting a concrete mix or mix design subsequently to the adjustment in step (C), and thereafter making a further concrete mix that reflects the adjustment made to the concrete mix or mix design.

In a sixteenth exemplary embodiment, which may be based on the fifteenth exemplary embodiment, the invention provides a method further comprising displaying on visual display screen the diagnostic delta data curve calculated from $\Delta$-Slump and $\Delta$-H$_2$O obtained from at least 10 deliveries (more preferably at least 50 deliveries, and most preferably at least 100 deliveries), the curve illustrated as having a point at which $\Delta$-Slump and $\Delta$-H$_2$O both equal zero (in the case of subtractive differences; one in the case of ratios), intersecting horizontal axis and vertical axis at (0, 0) (in the case of subtractive differences; (1, 1) in the case of ratios), wherein the horizontal axis indicates $\Delta$-H$_2$O and the vertical axis indicates $\Delta$-Slump.

In a seventeenth exemplary embodiment, the invention provides a method comprising: collecting $\Delta$-Slump and $\Delta$-H$_2$O data pairs from a plurality of delivered concrete loads using a slump monitoring device on at least one concrete delivery truck, deriving a "diagnostic delta data" (DDD) curve (i.e., a visual profile) based on a curvilinear relationship of averaged and/or normalized $\Delta$-Slump and $\Delta$-H$_2$O data pairs wherein, in at last one of the pairs, the target slump and target water content were met (e.g., wherein $\Delta$-Slump=$\Delta$-H$_2$O=zero ((+/−1.5 inches in the case of $\Delta$-Slump; +/−s1.5 gallons per cubic yard of concrete in the case of $\Delta$-H$_2$O; preferably 1.0, more preferably 0.50, most preferably 0.25 in either case) in the case of subtractive differences; $\Delta$-Slump=$\Delta$-H$_2$O=one in the case of ratios)); and displaying, on a monitor or screen, the DDD curve intersecting two perpendicular axes (e.g., at or near (0, 0) in the case of subtractive differences and (1, 1) in the case of ratios) and further displaying, in spaced relationship to the DDD curve, at least one $\Delta$-Slump, $\Delta$-H$_2$O data pair (and preferably a plurality of such data pairs), which in further exemplary embodiments may be obtained from another or subsequent concrete mix load delivery, wherein at least one or both of the A-slump and $\Delta$-H$_2$O values are less or greater than zero (in the case of subtractive differences; $\Delta$-Slump=$\Delta$-H$_2$O=one in the case of ratios). (In this example, the delta values for slump and water are calculated based on differences between target and monitored values).

In a further exemplary embodiment, which may be based upon any of the foregoing embodiments, the invention provides a method or system wherein the slump data and water content data of at least one concrete delivery, wherein slump and water content targets have been met (e.g., wherein at least one Δ-Slump, Δ-H$_2$O data pair are both equal to zero where subtractive differences are used and thus plottable at (0, 0) or are both equal to one where ratios are used and thus plottable at (1, 1); and wherein a quadrant is generated and illustrated on a monitor screen; and wherein (A) a DDD curve is displayed as intersecting perpendicular lines representing Δ-Slump and Δ-H$_2$O values (as exemplified in FIGS. 1 and 2); (B) information regarding adjustments to cement, plasticizer, water, or combination of these is displayed within a particular quadrant (e.g., information of the type found in columns and rows of the chart in FIG. 3); or (C) wherein the monitor screen can be toggled between or toggled to combine the information of (A) and (B).

In still further exemplary embodiments, the inventors believe that determination of a particular Δ-Slump, Δ-H$_2$O data pair (dot) within a particular section of the quadrant (as established once a DDD curve is obtained), without necessarily determining location of the dot with respect to the DDD curve itself, may be in itself be useful for doing rough adjustments to the concrete mix or mix design. An exemplary method of the present invention for adjusting a concrete mix load or mix design comprises: (A) batching at least one concrete mix load using a concrete mix design, into a concrete mixer drum, and calculating for the at least one concrete mix load a delta slump value (Δ-Slump) and a delta water content value (Δ-H$_2$O) wherein: (i) Δ-Slump value is calculated as the difference between a target slump value (e.g., as set forth in a batch ticket) for the at least one concrete mix load and the slump value obtained for the at least one concrete mix during delivery thereof from the batch plant to a construction site (e.g., during transit from the batch plant to the construction site, during discharge/pour); and (ii) Δ-H$_2$O value is calculated as the difference between a target maximum water content (e.g., as forth in a batch ticket, received from concrete producer or its batch processor, received from dispatch center) for the at least one concrete mix load and the water content value as determined for the concrete mix during delivery thereof from the batch plant to a construction site; (B) comparing the obtained Δ-Slump and Δ-H$_2$O with two perpendicular axes comprising a horizontal axis representing Δ-Slump equal to zero and a vertical axis representing Δ-H$_2$O equal to zero; and (C) adjusting, or providing an indication of adjustment to, based on the location of the obtained delta values with respect to the axes, at least one of the following properties chosen from: slump, water content, cement content, chemical plasticizer content, aggregate content, or a combination thereof, in the at least one concrete mix load or a concrete mix design from which the at least one concrete mix load was batched, and delivering the at least one concrete mix load at a construction site after the adjustment is made to the mix load or batching at least one concrete mix load using the adjusted concrete mix design after the adjustment is made.

While the invention is described herein using a limited number of embodiments, these specific embodiments are not intended to limit the scope of the invention. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . .50%, 51%, 52% . . . 95%, 96%, 97%, 98%, 99%, or 100%. Moreover, any numerical range represented by any two values of R, as calculated above, is also specifically disclosed.

Example 1

In an exemplary method of the invention, an automated slump monitoring system (e.g., Verifi® Monitoring System from GCP Applied Technologies Inc. of Cambridge MA) is used to acquire various slump and water content data over a 3-12 month period. The data is collected and examined as discussed below. The delta slump value (Δ-Slump) and delta water content value (Δ-H$_2$O) are calculated based on differences between target (or maximum) values minus the monitored values of the concrete during delivery, for ease of explanation and illustration.

The data included consideration of the following properties and delivery states of the concrete mix load: a strength indication expressed as a delta water content value (L-H$_2$O) that is calculated as a target water content (or a maximum water content indicated by concrete producer on batch ticket) minus the batch water and added water amounts at relatively same events or points during delivery (hereinafter Δ-H$_2$O in gallons per cubic yard, gpy); a rheology or slump indication expressed as a delta slump value (Δ-Slump) which is calculated as a target slump minus the slump value at the same events or points during delivery (Δ-Slump in inches, in); as well as age of the concrete (expressed in terms of minutes after initial batch mixing).

The graph of FIG. 1 shows Δ-H$_2$O (horizontal axis) plotted against Δ-Slump (vertical axis) and illustrated as dots. Each dot is colored to indicate the age of the concrete, and a color bar is provided beneath the main graph of FIG. 1 to indicate age in terms of time from initial mixing of the components together to form the concrete.

Parallel to the horizontal axis is a histogram of Δ-Slump, while parallel to the x-axis is a histogram of the Δ-H$_2$O. Overlaid are "x" markers which represent data from deliveries in which there was at least one slump and water content targets that were achieved (Δ-H$_2$O=Δ-Slump=zero). In other words, if during the delivery of the concrete there were four data points (Δ-H$_2$O, Δ-Slump pairs), and one of them achieved the target (Δ-H$_2$O=Δ-Slump=zero), all four data points would be represented as "x" markers. Deviation of the other three data points from (0, 0) clue into the water efficiency. Using these points by plotting at (0, 0) on the graph helped to visualize a basic non-linear regression whereby an exponential curve could be visualized among the data points. This non-linear relationship is termed a "diagnostic delta data" (DDD) curve which is useful for adjusting the concrete mix or mix design, or otherwise to illustrate to a concrete producer, project manager, or other manager the state of the concrete mix.

Data point constellations are resolved into the DDD curve, illustrated as shown FIG. 2, in which four quadrants are defined by vertical axis ($\Delta$-Slump) and horizontal axis ($\Delta$-H$_2$O), and can be derived, for example, by averaging the points to obtain a curvilinear shape that intersects (0, 0) which represents the data point at which $\Delta$-H$_2$O=$\Delta$-Slump=zero.

For example, if one or more concrete mix loads are monitored for slump and water content and shown to have data points for $\Delta$-Slump and $\Delta$-H$_2$O appearing in Quadrant 2 (See FIGS. 1 and 2), this means that the concrete slump is below target while the water content is above target. Thus, an appropriate protocol would include instructions for the slump monitor or batch system processor (or for the slump monitoring system processor to send indications to the concrete producer or batch plant system processor) not to allow any more water amounts or added water into the concrete mix; but, instead, the system processor is instructed to prescribe or effectuate added or additional amounts of chemical plasticizer (e.g., a high range water reducer) to increase slump of the concrete to or towards the slump target value. Alternatively, or in combination with the exemplary action above, slump monitoring system processor can send indications to the batch plant (concrete producer) that the concrete mix design should be changed, to decrease the amount of the batch water or water content target, downwards to prevent overshooting of the target water content. With decreases in the water content, the strength is likely to be increased, such that cement may also be adjusted downward in the mix design.

Example 2

As another example, if one or more concrete mix loads are monitored for slump and water content and shown to have data points for $\Delta$-Slump and $\Delta$-H$_2$O appearing in Quadrant 4 (See FIGS. 1 and 2): this means that the concrete slump is above target, while the water content is below target. In this case, no adjustment is advised for the current delivery since the result is that the strength value of the concrete delivered would exceed the target. For subsequent deliveries, however, the amount of chemical plasticizer in the concrete mix design can be decreased and replaced with water to meet both the slump and water targets.

Example 3

The present inventors note that for concrete mix loads that are monitored for slump and water content, wherein $\Delta$-Slump and $\Delta$-H$_2$O values are plotted and one or more data points are found to be located in Quadrants 1 and 3 (See FIGS. 1 and 2), the appropriate action to be taken for a given delivery load of concrete, or the mix design which will be used for making subsequent concrete loads to be delivered, can depend on whether, for a given currently monitored $\Delta$-H$_2$O data point, the $\Delta$-Slump value is above or below the DDD curve.

Appreciation of the DDD curve (as shown in FIGS. 1 and 2) can be enhanced by reference to the exemplary protocol adjustments summarized in FIG. 3 (for certain situations). These exemplary adjustment protocols include increasing or decreasing water, chemical plasticizer, and/or cement.

Thus, for example, in concrete mixes wherein $\Delta$-Slump and $\Delta$-H$_2$O values are calculated, and, when plotted against the DDD curve and found to reside in Quadrant 1, both $\Delta$-Slump and $\Delta$-H$_2$O values will be understood to be above their respective slump and water content target levels. For points above the DDD curve (See e.g. 24 in FIG. 2), a reduction in water and admixture would be advised, whereas for points below the DDD curve (See e.g. 26 in FIG. 2), a reduction in water and an increase in plasticizer amount would be a suitable exemplary adjustment protocol.

Furthermore, for a reduction in water for both, the cement can be removed from subsequent mixes. Thus, one may adjust the concrete mix design so as to reduce cement amount, and hence avoid the amount of carbon dioxide associated with manufacture of cement.

For points that fall within Quadrant 3, monitored slump and water content are below target values; and so for those points above the DDD curve (See e.g., 28 in FIG. 2), an increase in water is sufficient. However, for points below the DDD curve (See e.g. 30 in FIG. 2), an increase in water only would result in exceeding the water limit, and thus a plasticizer is required.

It is noted here that, while the present inventors will use the phrases "points above the DDD curve" and "points below the DDD curve," due to the variability of factors (e.g., raw materials, cement, nature of aggregates, etc.) in the concrete production processes, there could be a margin of error (e.g., +/−0.5 inch slump, +/−0.5 gallon water) such that the location of a dot above or below the line does not necessarily trigger an adjustment. It may be more proper to talk about the location of dot representing a $\Delta$-Slump, $\Delta$-H$_2$O value as being "above" or "below" a "band", rather than a line. However, the "above/below the line" phraseology has been employed for ease of discussion in the present specification. Hence, this example illustrates use of the DDD curve in decision making for both current and subsequent deliveries.

Example 4

Linear Regression Analysis for Deriving DDD Curve. For a given concrete mix design, an exemplary selection of concrete load deliveries (as selected from a database of stored deliveries wherein slump and water content has been recorded) can be made based on a group of deliveries having one or more deliveries wherein $\Delta$-Slump=$\Delta$-H$_2$O=zero (e.g., illustrated at (0, 0) in FIGS. 1-2); or, if not at (0, 0), then within an acceptable tolerance, such as slump (+/−0.5 inch and water content (+/−0.5 gallons per cubic yard (gpy) of concrete. This subset can be further refined by using additional criteria, for example, same time periods (e.g. same week), same initial slump values (e.g. 4" slump), same plants where the concrete was produced and batched into the trucks, same contractors who place the concrete at the job site, same age of concrete (e.g. 100-150 revs after batching or 30-45 minutes after batching, etc. It is preferred to at least refine the dataset by excluding any deliveries where a chemical plasticizer was added and affected the slump.

The refined delta water content values can be taken as the independent variable, x; and the refined delta slump values can be taken as dependent variable, y. Other data processing techniques such as outlier detection and removal can be performed to remove erroneous data. With the x and y data, different regression techniques can be applied such as linear regression. In FIGS. 1 and 2, a regression analysis was done to fit data to an equation of the form: y=a*exp(−b*x)+c, where a, b, c are fitting parameters and exp is the exponential function. Methods such as the Levenberg-Marquardt algorithm can be used to determine the fitting parameters a, b, c. In this case, a=−3.82, b=0.278 and c=3.99.

Equations of different forms can be used, such as y=a*x+b (simple linear function), as well as other forms including other polynomials, powers, logarithms, etc. The dots 20-30 shown in FIG. 2, for example, could represent either single deliveries or averages of multiple deliveries of concrete made from a mix design. In Quadrant 1, 24 represents a delivery or average of multiple deliveries that is 4.5 gpy high and 4.6" high. In one scenario, the producer may want to reduce water by 4.5 gpy.

The resulting change in slump can be determined, for example, using the DDD curve. Using the equation $y=a*\exp(-b*x)+c$, and taking x as 4.5, then $y=-3.82*\exp(-0.278*x)+3.99$, and hence $y=2.9$ which implies that a drop in slump of 2.9 inches would arise with a change in 4.5 gpy. An estimate of the new position for 24 is (0, 1.7). The slump is estimated to remain above target, such that plasticizer amount can be reduced in the mix or mix design. This can be calculated using, for example, a nominal dose curve (See e.g., U.S. Pat. No. 8,311,678 or 9,789,629). Alternatively, the effect of plasticizer upon slump can be estimated using a rule of thumb (e.g., 1 fluid ounce of plasticizer per cubic yard concrete increases slump by one inch). Thus, plasticizer can be reduced by 1.7 opy (ounce per cubic yard) to achieve (0, 0).

Furthermore, it is likely that with the reduction in water and subsequent water/cement (w/c) ratio, the strength of the resultant concrete would increase. In this case, it might be beneficial to remove cement by using a known relationship between w/c, cement, and strength. These relationships can be developed in the lab, or more preferred based on actual field data. First, the strength increase can be determined knowing the decrease in w/cm. Then, the reduction in cement can be calculated based on the strength increase. Alternatively, the cement can be adjusted to maintain the original w/c ratio.

In Quadrant 1 of FIG. 2, the dot designated at 26 represents a delivery or average of multiple deliveries that is 7.7 gpy high and 1.0" high. In one scenario, the producer may want to reduce water by 7.7 gpy. The resulting change in slump can be determined, for example, using the DDD curve. Plugging 7.7 as x in $y=-3.82*\exp(-0.278*x)+3.99$ yields 3.5. Accordingly, it is estimated that 3.5" slump changes with water addition of 7.7 gpy. An estimate of the new position for 24 is shown in FIG. 2 is (0, −2.5). The slump is now estimated to be below the target. So the amount of plasticizer in the concrete can be increased. This can be calculated using, for example, a nominal dose curve (See e.g., U.S. Pat. No. 8,311,678 or 9,789,629), or the rule of thumb for chemical plasticizer addition (e.g., 1" slump increase per 1 opy concrete). In the latter case, the plasticizer amount can be increased by 2.5 opy (ounces per cubic yard), to achieve (0, 0). Strength of concrete is likely to increase, and the cement can be adjusted to maintain the original strength.

In Quadrant 1 of FIG. 2, the dot designated at 20 represents a delivery or average of multiple deliveries that is 4.3 gpy high and 1.7" low. In one example situation, the concrete producer may want to reduce water by 4.3 gpy. The resulting change in slump can be determined, for example, using the DDD curve. Plugging 4.3 as x into the equation, $y=-3.82*\exp(-0.278*x)+3.99$, yields 2.8. Accordingly, one can expect an estimate 2.8" slump drop with a water reduction of 4.3 gpy. Thus, an estimate of the new position for the dot designated at 24 in FIG. 2 is (0, −4.5). The slump is now estimated to still be below the target. So, the amount of plasticizer can be increased. This can be calculated using, for example, a nominal dose curve (See e.g., U.S. Pat. No. 8,311,678 or 9,789,629); or alternatively by using the rule of thumb by which plasticizer dose of 1 opy concrete achieves 1" slump increase. In the latter case, the plasticizer amount can be increased by 4.5 opy (ounces per cubic yard), to achieve (0, 0). Again, the strength is likely to increase, and the cement can be adjusted as mentioned previously to maintain the original strength.

In Quadrant 1 of FIG. 2, the dot designated at 30 represents a delivery or average of multiple deliveries that is 0.7 gpy low and 4.8" low. In one scenario, the producer may want to increase water by 0.7 gpy. The resulting change in slump can be determined, for example, using the DDD curve. Plugging −0.7 as x into the equation, $y=-3.82*\exp(-0.278*x)+3.99$, yields −0.66. Accordingly, one can expect an estimated 0.66" increase in slump with a water increase of 0.7 gpy. Thus, an estimate of the new position for 24 as designated in FIG. 2 would be (0, −4.1). The slump is now estimated to remain below target; thus, the plasticizer amount can be increased. This can be calculated using, for example, a nominal dose curve (see patents cited above); or by using the rule of thumb for the particular plasticizer (e.g. 1 opy provides increase of 1" slump). In the latter case, the plasticizer dosage can be increased by 4.1 opy (ounces per cubic yard), to achieve (0, 0). In this case, the strength may decrease with the increase in the w/c ratio. The cement can be adjusted as mentioned previously to maintain the original strength.

In Quadrant 3 of FIG. 2, the dot designated at 28 represents a delivery or average of multiple deliveries that is 6.0 gpy low in terms of water and 1.4" low in terms of slump. In one scenario, the producer may want to increase water by 6.0 gpy. The resulting change in slump can be determined, for example, using the DDD curve. Plugging −6.0 as x into the equation, $y=-3.82*\exp(-0.278*x)+3.99$, yields 16.3. Accordingly, one can expect an estimated one can estimate a 16.3" increase in slump with water increase of 6.0 gpy. Thus, an estimate of the new position for the dot designated at 24 in FIG. 2 would be (0, 14.9). The slump is now estimated to be above the target. So plasticizer amount can be decreased. Slump values cannot actually exceed 12" and so this slump prediction is not valid. One may choose simply to replace 14.9 with 12 or simply continue in calculating the admixture reduction. This can be calculated using, for example, a nominal dose curve; or alternatively a rule of thumb can be used for the plasticizer (e.g. 1" slump increase per 1 opy). In the latter case, the admixture can be decreased by 14.9 opy (ounces per cubic yard), to achieve (0, 0). Again, the strength is likely to decrease and can be adjusted as mentioned previously.

In Quadrant 3 of FIG. 2, the dot designated at 22 represents a delivery or average of multiple deliveries that is 2.5 gallons per yard (gpy) low in water content and 1.3" high in slump value. As one example, the concrete producer may want to increase water by 2.5 gpy. The resulting change in slump can be determined, for example, using the DDD curve. Inserting the number −2.5 as x in the equation, $y=-3.82*\exp(-0.278*x)+3.99$, one therefore obtains −3.7. Accordingly, one could expect an estimated 3.7" increase in slump with the water increase of 2.5 gpy. Thus, an estimate of the new position for the dot designated at 24 in FIG. 2 would be (0, 5). The slump is now estimated to be above the target. So, the amount of admixture can be decreased. This can be calculated using, for example, a nominal dose curve; or alternatively a rule of thumb can be used for the plasticizer (e.g. 1" slump increase per 1 ounce per yard or opy of concrete). In the latter case, the admixture can be decreased by 5 opy (ounces per cubic yard), to achieve (0, 0). Again, the strength is likely to decrease and can be adjusted as mentioned previously.

In all these cases, an "incremental" approach is preferred. A check can be made after each increment, reducing risk of faulty calculation. Where plasticizer amount is to be reduced, it may not be possible to reduce. However, the skilled artisan will understand in view of these teachings that other changes to the mix design can be made, monitored, and implemented for decreasing slump: e.g., such as by adjusting sand/stone ratio or aggregate/cement ratio.

The foregoing example and embodiments were present for illustrative purposes only and not intended to limit the scope of the invention.

It is claimed:

1. A method for adjusting a concrete mix or mix design, comprising:
  (A) batching at least one concrete mix load using a concrete mix design, into a concrete mixer drum, and calculating for the at least one concrete mix load a delta slump value ($\Delta$-Slump) and a delta water content value ($\Delta$-$H_2O$) wherein:
    i. $\Delta$-Slump value is calculated based on differences between a target slump value for the at least one concrete mix load and the slump value obtained for the at least one concrete mix during delivery thereof from a batch plant to a construction site; and
    ii. $\Delta$-$H_2O$ value is calculated based on differences between a target maximum water content for the at least one concrete mix load and the water content value as determined for the concrete mix during delivery thereof from the batch plant to a construction site;
  (B) comparing the obtained $\Delta$-Slump and $\Delta$-$H_2O$ with a diagnostic delta data curve defined by at least two data points, wherein each of the at least two data points is based on at least one concrete load delivery wherein both slump and water content targets are met, and wherein at least one other data point concerns at least one concrete load delivery wherein at least one or both of the slump and water contents are not met; and
  (C) adjusting, or providing an indication of adjustment to, at least one of the following properties chosen from: slump, water content, cement content, chemical plasticizer content, aggregate content, or a combination thereof, in the at least one concrete mix load or a concrete mix design from which the at least one concrete mix load was batched, and delivering the at least one concrete mix load at a construction site after the adjustment is made to the mix load or batching at least one concrete mix load using the adjusted concrete mix design after the adjustment is made.

2. The method of claim 1 wherein, in step (A), a plurality of concrete mix loads are batched and delivered, and, in step (B), the diagnostic delta data curve is defined by a plurality of data points from the plurality of concrete mix load deliveries wherein at least one of the data points is based on slump and water content targets being met.

3. The method of claim 1 wherein, in the adjusting step (C), the adjustment is initiated by a concrete slump monitoring system based on the concrete delivery truck or by a concrete batching system at the batch plant, wherein a system processor accesses a collection of protocols for adjusting the concrete mix or mix design based on whether one or both slump and water content targets are met and initiates at least one adjustment to the concrete mix or mix design or otherwise initiates an indication to the effect that the concrete mix or concrete mix design requires that at least one adjustment be made.

4. The method of claim 3 wherein, when a concrete mix is detected to have both $\Delta$-Slump and $\Delta$-$H_2O$ greater than zero, where these delta values are calculated based on differences between target values and monitored values, a processor initiates an indication that adjustment needs to be made to the mix design to the effect that discharge of concrete contained in the mixer drum of a concrete delivery truck should be delayed to allow for slump of the load to decrease over time.

5. The method of claim 3 wherein, when a concrete mix is detected to have both $\Delta$-Slump and $\Delta$-$H_2O$ less than zero, where these delta values are calculated based on differences between target values and monitored values, a processor initiates an adjustment to a concrete mix or mix design to the effect that more water or plasticizer is added into a concrete mix or included into a concrete mix design; or a processor initiates an indication or adjustment that more water or chemical plasticizer should be added into future concrete mix loads or into the concrete mix design.

6. The method of claim 3 wherein, when a concrete mix is detected to have $\Delta$-Slump>0 and $\Delta$-$H_2O$<0, the delta values being calculated based on differences between target values and monitored values, a processor initiates an indication that pouring of a concrete mix load in a delivery truck mixer drum should be delayed to allow for slump of the load to decrease over time; or, alternatively, initiates an indication that an adjustment should be made in the concrete mix design, or initiates an adjustment, the adjustment being chosen from changing water content or plasticizer amount or relative proportions thereof.

7. The method of claim 3 wherein, when a concrete mix is detected to have $\Delta$-Slump<0 and $\Delta$-$H_2O$>0, the delta values being calculated based on differences between target values and monitored values, a processor initiates an indication that an adjustment to the concrete mix or mix design should be made, or otherwise makes an adjustment to the concrete mix or mix design, the adjustment comprising adding chemical plasticizer, adding aggregate, adding cement, or combination thereof.

8. The method of claim 3, wherein at least three protocols are stored in memory and available for access by a processor of a batching or slump monitoring system, the protocols comprising at least one adjustment or indication that an adjustment needs to be made to a mix or mix design, relative to where (A) both $\Delta$-Slump and $\Delta$-$H_2O$ are >0; (B) both $\Delta$-Slump and $\Delta$-$H_2O$ are <0; and (C) $\Delta$-Slump<0 and $\Delta$-$H_2O$>0, or $\Delta$-Slump>0 and $\Delta$-$H_2O$<0, wherein the delta values are calculated based on differences between target values and monitored values; and the processor accesses and executes at least one of said protocols depending upon whether one or both $\Delta$-Slump and $\Delta$-$H_2O$ are greater or equal to 0.

9. The method of claim 1 wherein $\Delta$-Slump and $\Delta$-$H_2O$ is calculated for a current delivery concrete mix load based on differences between target values and monitored values, and based on a comparison with the DDD curve for the mix design, a processor sends a warning or an indication to a concrete batch plant operator or batching system processor that the concrete mix design requires adjustment, the adjustment comprises at least one change to water content, plasticizer, cement, aggregates, or combination thereof, or to relative proportions of any of the foregoing components, whereby subsequent concrete loads batched from the mix design are determined to have an adjustment of $\Delta$-Slump, $\Delta$-$H_2O$, or both towards the state wherein $\Delta$-Slump or $\Delta$-$H_2O$ or both values are closer to zero.

10. The method of claim 1 wherein the diagnostic delta data curve, derived from delta values calculated based on differences between target values and monitored values, is visually illustrated on a screen device as intersecting perpendicular axes defining four quadrants, wherein a first quadrant corresponds to Δ-Slump>0 and Δ-H$_2$O>0; a second quadrant corresponds to Δ-Slump>0 and Δ-H$_2$O<0; a third quadrant corresponds to Δ-Slump<0 and Δ-H$_2$O<0; and a fourth quadrant corresponds to Δ-Slump<0 and Δ-H$_2$O>0.

11. The method of claim 10, wherein the diagnostic delta data curve, derived from delta values calculated based the differences between target values and monitored values, is illustrated as intersecting both the vertical axis and horizontal axis at a common point.

12. The method of claim 1 wherein, where an automated slump monitoring system detects that Δ-Slump exceeds 5 inches, and Δ-H$_2$O exceeds 5 gallons per yard of concrete, then the slump monitoring system sends an indication to a concrete plant operator to adjust the concrete mix design and illustrates the monitored Δ-Slump and Δ-H$_2$O values as a data point on the diagnostic delta data curve illustrated as intersecting both the vertical axis and horizontal axis at a common point, and the data point is shown as plotted as non-coinciding with the diagnostic delta data curve.

13. The method of claim 12, wherein the slump monitoring system sends an indication to a concrete plant operator to adjust the concrete mix design and illustrates the monitored Δ-Slump and Δ-H$_2$O values as a data point on the diagnostic delta data curve illustrated as intersecting both the vertical axis and horizontal axis at a common point, and the data point is shown as plotted as non-coinciding with the diagnostic delta data curve, when Δ-Slump exceeds 1 inch, and Δ-H$_2$O exceeds 1 gallon per yard of concrete.

14. The method of claim 1 wherein at least one data point is illustrated with respect to the diagnostic delta data curve on a monitor screen, wherein the method further comprises providing an interactive data retrieval function whereby a user touches the monitor screen at one of the four quadrant locations defined by the intersecting vertical and horizontal axis, thereby activating data retrieval which data comprises a concrete producer's concrete mix data information on the monitor screen.

15. A system comprising: at least one slump monitoring system for monitoring slump and water content and additions in a concrete mix load contained in rotatable mixer drums on concrete delivery trucks, the system having sensors for monitoring concrete slump and water additions introduced into the concrete load, the sensors communicative with a slump monitoring system processor, characterized in that the processor is configured or programmed to perform the method according to claim 1.

16. The method of claim 1, wherein the Δ-Slump value is calculated based on subtractive differences or ratios between a target slump value as set forth in a batch ticket.

17. The method of claim 1, wherein the Δ-H$_2$O value is calculated based on subtractive differences or ratios between a target maximum water content as forth in a batch ticket.

18. A method for effectuating or improving processor-driven adjustment to a concrete mix design or concrete mix design, comprising:
(A) collecting slump and water content data, using at least one slump monitoring system, from a plurality of deliveries of concrete mix loads made from a concrete mix design;
(B) calculating delta slump value (Δ-Slump) and a delta water content value (Δ-H$_2$O) for the plurality of deliveries, wherein: Δ-Slump value is calculated based on differences between a target slump value for the at least one concrete mix load and the slump value obtained for the at least one concrete mix during delivery thereof from the batch plant to a construction site; and Δ-H$_2$O value is calculated based on differences between a target maximum water content for the at least one concrete mix load and the water content value as determined for the concrete mix during delivery thereof from the batch plant to a construction site;
(C) establishing a diagnostic delta data curve derived by at least two data points selected from data obtained from the plurality of concrete deliveries, at least one data point of which contains Δ-Slump=Δ-H$_2$O=zero (+/−1.5 inches in the case of Δ-Slump, +/−1.5 gallons per cubic yard of concrete in the case of Δ-H$_2$O), where the delta values are calculated based on differences between target values and monitored values, and wherein the at least one other data point concerns at least one concrete load delivery wherein at least one of Δ-Slump and Δ-H$_2$O (and more preferably both) are less or greater than zero; and
(D) adjusting a concrete mix or mix design based on a comparison of Δ-Slump and Δ-H$_2$O of a concrete mix load delivery with the diagnostic delta data curve, the adjustment being made in terms of cement, plasticizer, or cement amount or proportion with the concrete mix or mix design; and
(E) making or adjusting a concrete mix or mix design subsequently to the adjustment in step (C), and thereafter making a further concrete mix that reflects the adjustment made to the concrete mix or mix design.

19. The method of claim 18 further comprising displaying on visual display screen the diagnostic delta data curve calculated from Δ-Slump and Δ-H$_2$O obtained from at least 10 deliveries, the delta values being calculated based on differences between target values and monitored values, the curve illustrated as having a point at which Δ-Slump and Δ-H$_2$O both equal zero (and intersect horizontal axis and vertical axis at (0, 0) wherein the horizontal axis indicates delta water content values and the vertical axis indicates delta slump values).

20. The method of claim 18, wherein the Δ-Slump value is calculated based on subtractive differences or ratios between a target slump value as set forth in a batch ticket.

21. The method of claim 18, wherein the Δ-H$_2$O value is calculated based on subtractive differences or ratios between a target maximum water content as forth in a batch ticket.

22. The method of claim 18, wherein said at least one data point of which contains Δ-Slump=Δ-H$_2$O=+/−1 inch in the case of Δ-Slump and +/−1 gallon per cubic yard of concrete in the case of Δ-H$_2$O.

23. A method comprising: collecting Δ-Slump and Δ-H$_2$O data pairs from a plurality of delivered concrete loads using a slump monitoring device on at least one concrete delivery truck, deriving a "diagnostic delta data" (DDD) curve based on a curvilinear relationship of averaged and/or normalized Δ-Slump and Δ-H$_2$O data pairs wherein, in at least one of the pairs the target slump and target water content were met; and displaying, on a monitor or screen, the DDD curve and at least one other Δ-Slump, Δ-H$_2$O data pair wherein at least one or both of the Δ-Slump and Δ-H$_2$O values are less or greater than zero, where the delta values are calculated based on differences between the target values and the monitored values, and wherein Δ-Slump value is calculated based on differences between a target slump value for the at least one concrete mix load and the slump value obtained for the at least one concrete mix during delivery thereof from a batch plant to a construction site; and Δ-H$_2$O value is calculated based on differences between a target maximum water content for the at least one concrete mix load and the water content value as determined for the concrete mix during delivery thereof from the batch plant to a construction site.

\* \* \* \* \*